(12) United States Patent
Seto

(10) Patent No.: US 7,659,934 B2
(45) Date of Patent: Feb. 9, 2010

(54) RECORDING/REPRODUCTION APPARATUS, AND RECORDING/REPRODUCTION METHOD AS WELL AS STEREOSCOPIC IMAGES VISUAL EFFECTS CONFIRMATION APPARATUS AND STEREOSCOPIC IMAGE VISUAL EFFECTS CONFIRMATION METHOD

(75) Inventor: Hiroaki Seto, Kanagawa (JP)

(73) Assignee: Sony Corporation, Tokyo (JP)

( * ) Notice: Subject to any disclaimer, the term of this patent is extended or adjusted under 35 U.S.C. 154(b) by 528 days.

(21) Appl. No.: 11/376,464

(22) Filed: Mar. 15, 2006

(65) Prior Publication Data

US 2006/0210249 A1  Sep. 21, 2006

(30) Foreign Application Priority Data

Mar. 16, 2005  (JP)  ............................. P2005-075481

(51) Int. Cl.
*H04N 5/222* (2006.01)
*H04N 13/00* (2006.01)
*H04N 5/262* (2006.01)

(52) U.S. Cl. ...................... 348/333.12; 348/42; 348/239

(58) Field of Classification Search .................... 348/42, 348/48, 222.1, 239, 670, 333.02, 333.09, 348/333.12; 345/815
See application file for complete search history.

(56) References Cited

U.S. PATENT DOCUMENTS 5,986,706 A * 11/1999 Hirasawa ..................... 348/372

| | | | |
|---|---|---|---|
| 6,507,359 B1 * | 1/2003 | Muramoto et al. | ............ 348/47 |
| 7,098,914 B1 * | 8/2006 | Katayama et al. | ............ 345/427 |
| 7,209,163 B1 * | 4/2007 | Ono | ....................... 348/207.99 |
| 7,221,395 B2 * | 5/2007 | Kinjo | ........................ 348/239 |

FOREIGN PATENT DOCUMENTS

| | | |
|---|---|---|
| JP | 11 69381 | 3/1999 |
| JP | 2002 223402 | 8/2002 |
| JP | 2002 300472 | 10/2002 |

* cited by examiner

*Primary Examiner*—Nhan T Tran
*Assistant Examiner*—Trung Diep
(74) *Attorney, Agent, or Firm*—Frommer Lawrence & Haug LLP; William S. Frommer; Ellen Marcie Emas

(57) ABSTRACT

The present invention relates to an apparatus and a method for recording/reproduction of images with which the visual effects of a plurality of images can be visually confirmed with ease. The apparatus includes a recording/reproduction section that records a plurality of input sets of video data and reads them from the recording mediums for reproduction; an arithmetic operation section that performs arithmetic operations by a method corresponding to an external instruction on the plurality of sets of video data reproduced by the recording/reproduction section; and a superimposition section that generates character-string data indicating the arithmetic operation method of the arithmetic operation section, superimposes the arithmetic video data produced by arithmetic operations of the arithmetic operation section and the character-string data and outputs the superimposed video data produced by the superimposition as outcome of arithmetic operations.

15 Claims, 14 Drawing Sheets

RECORDING/REPRODUCTION APPARATUS, AND RECORDING/REPRODUCTION METHOD AS WELL AS STEREOSCOPIC IMAGES VISUAL EFFECTS CONFIRMATION APPARATUS AND STEREOSCOPIC IMAGE VISUAL EFFECTS CONFIRMATION METHOD

CROSS REFERENCES TO RELATED APPLICATIONS

The present invention contains subject matter related to Japanese Patent Application JP 2005-075481 filed in the Japanese Patent Office on Mar. 16, 2005, the entire contents of which being incorporated herein by reference.

BACKGROUND OF THE INVENTION

1. Field of the Invention

The present invention relates to an apparatus and a method for recording/reproduction and also to an apparatus and a method for stereoscopic image visual effects confirmation that can suitably be used for a recording/reproduction apparatus for recording video data of a plurality of systems and reproduce images according to the video data.

2. Description of the Related Art

Multi-channel reproduction apparatus that readout a plurality of sets of video data wanted respectively by a plurality of users from a plurality of sets of video data recorded on a plurality of recording mediums and immediately provide a plurality of images based on the plurality of sets of video data to the respective users when it receives reproduction requests for the images from the users are popularly being used.

However such apparatus are accompanied by a problem that a predetermined waiting time has to be spent from the time when the apparatus receives image reproduction requests from plurality of users until the time when the plurality of sets of video data that correspond to the reproduction requests are read out from the respective recording mediums.

As an attempt for dissolving the problem, there have been proposed multi-channel reproduction apparatus that store predetermined leading data of each of the plurality of sets of video data recorded on the plurality of recording mediums respectively in a plurality of buffers arranged in parallel with the plurality of recording mediums and immediately transfer leading data stored in the buffer in response to the reproduction requests made by the plurality of users so that images can be provided to the users according to the desired video data without waiting time (for example, refer to Jpn. Pat. Appln. Laid-Open Publication No. 8-9335).

SUMMARY OF THE INVENTION

However, in such known multi-channel reproduction apparatus, the users have to issue respective reproduction requests in such a way that the reproduced images of the channels are synchronized so that the users may confirm the images of the channels simultaneously and, when the images of the channels are displayed simultaneously, external apparatus such as switchers and effectors need to be provided if special effects such as color conversion and image conversion need to be produced for the images of the channels.

Additionally, the images of the channels are displayed on respective display sections in such known multi-channel reproduction apparatus. This means that, when special effects such as color conversion and image conversion are produced for the images of the channels, all the display sections have to be adjusted so as to perfectly show a same color tone and a same level of brightness in order to confirm the special effects. Additionally, there is a problem that, when the images of the channels are synthetically combined on different display sections, the visual effects of the synthetically combined images cannot be directly and visually confirmed.

The present invention has been made in view of the above-identified problems, and is to propose an apparatus and a method for recording/reproduction of images and also to an apparatus and a method for stereoscopic image visual effects confirmation with which the visual effects of a plurality of images can be visually confirmed with ease.

According to an embodiment of the present invention, the above problems is achieved by providing a recording/reproduction apparatus including: a recording/reproduction means for recording a plurality of input sets of video data and reading them from recording mediums for reproduction, an arithmetic operation means for performing arithmetic operations by a method corresponding to an external instruction on the plurality of sets of video data reproduced by the recording/reproduction means, and a superimposition means for generating character-string data indicating the arithmetic operation method of the arithmetic operation means, superimposing the arithmetic video data produced by arithmetic operations of the arithmetic operation means and the character-string data and outputting the superimposed video data produced by the superimposition as outcome of arithmetic operations.

With this arrangement, it is no longer necessary to provide a plurality of display means for displaying images that correspond to a plurality of sets of video data and the users can visually confirm the superimposed image where the outcome of arithmetic operations and the character string showing the method of arithmetic operations are superimposed as the superimposed video data are output to a single display means as outcome of arithmetic operations.

According to an embodiment of the present invention, there is provided a recording/reproduction method including: a recording/reproduction step of recording a plurality of input sets of video data on recording mediums and reading them from the recording mediums for reproduction, an arithmetic operation step of performing arithmetic operations by a method corresponding to an external instruction on the plurality of sets of video data reproduced in the recording/reproduction step, and a superimposition step of generating character-string data indicating the arithmetic operation method of the arithmetic operation step, superimposing the arithmetic video data produced by arithmetic operations in the arithmetic operation step and the character-string data and outputting the superimposed video data produced by the superimposition as outcome of arithmetic operations.

With this arrangement, it is no longer necessary to provide a plurality of display means for displaying images that correspond to a plurality of sets of video data and the users can visually confirm the superimposed image where the outcome of arithmetic operations and the character string showing the method of arithmetic operations are superimposed as the superimposed video data are output to a single display means as outcome of arithmetic operations.

According to an embodiment of the present invention, there is provided a stereoscopic image visual effects confirmation apparatus including: a recording/reproduction means for recording input right eye video data and input left eye video data on an recording medium and reading them from the recording medium, a synthesis means for synthetically combining the right eye video data and the left eye video data reproduced by the recording/reproduction means and synthetically combining them for superimposition, and a superimposition means for generating character-string data indicating the synthesis method of the synthesis means, superimposing the synthesized video data synthetically produced by the synthesis means and the character-string data and outputting the superimposed video data produced by the superimposition as outcome of synthesis.

With this arrangement, it is no longer necessary to provide a plurality of display means for displaying images that correspond to a plurality of sets of video data and the users can visually confirm the superimposed image where the outcome of synthesis and the character string showing the method of synthesis are superimposed as the superimposed video data are output to a single display means as outcome of synthesis. Additionally, it is possible to allow the user to visually confirm a part of a stereoscopic image that appears as if jumping out in a simple manner only by outputting the superimposed video data as outcome of synthesis.

According to an embodiment of the present invention, there is provided a stereoscopic image visual effects confirmation apparatus including: a recording/reproduction step of recording input right eye video data and input left eye video data on an recording medium and reading them from the recording medium, a synthesis step of synthetically combining the right eye video data and the left eye video data reproduced in the recording/reproduction step and synthetically combining them for superimposition, and a superimposition step of generating character-string data indicating the synthesis method of the synthesis step, superimposing the synthesized video data synthetically produced in the synthesis step and the character-string data and outputting the superimposed video data produced by the superimposition as outcome of synthesis.

With this arrangement, it is no longer necessary to provide a plurality of display means for displaying images that correspond to a plurality of sets of video data and the users can visually confirm the superimposed image where the outcome of synthesis and the character string showing the method of synthesis are superimposed as the superimposed video data are output to a single display means as outcome of synthesis. Additionally, it is possible to allow the user to visually confirm a part of a stereoscopic image that appears as if jumping out in a simple manner only by outputting the superimposed video data as outcome of synthesis.

Thus, according to an embodiment of the present invention, a plurality of sets of video data is subjected to arithmetic operations by an externally specified method and character-string data that indicate the method of arithmetic operations are produced. Then, the superimposed video data produced by superimposing the arithmetic video data and the character-string data are output as outcome of arithmetic operations. Therefore, it is no longer necessary to provide a plurality of display means for displaying images that correspond to a plurality of sets of video data and the users can visually confirm the superimposed image where the outcome of arithmetic operations and the character string showing the method of arithmetic operations are superimposed as the superimposed video data are output to a single display means as outcome of arithmetic operations. In this way, it is possible to realize an apparatus and a method for recording/reproduction of images with which the visual effects of a plurality of images can be visually confirmed with ease.

Additionally, according to one embodiment of the invention, right eye video data and the left eye video data are synthetically combined and character-string data indicating the synthesis method are generated. Then, the synthesized video data and the character-string data are superimposed to produce superimposed synthesized video data, which are then out put as outcome of synthesis. Therefore, it is no longer necessary to provide a plurality of display means for displaying images that correspond to a plurality of sets of video data and the users can visually confirm the superimposed image where the outcome of synthesis and the character string showing the method of synthesis are superimposed as the superimposed video data are output to a single display means as outcome of synthesis. Additionally, it is possible to allow the user to visually confirm a part of a stereoscopic image that appears as if jumping out in a simple manner only by outputting the superimposed video data as outcome of synthesis. In this way, it is possible to realize an apparatus and a method for stereoscopic image visual effects confirmation with which the visual effects of a plurality of images can be visually confirmed with ease.

The nature, principle and utility of the invention will become more apparent from the following detailed description when read in conjunction with the accompanying drawings in which like parts are designate by like reference numerals or characters.

DETAILED DESCRIPTION OF THE PREFERRED EMBODIMENTS

Now, preferred embodiments of the present invention will be described in greater detail by referring to the accompanying drawings.

(1) Overall Configuration of the Embodiment of Recording/Reproduction Apparatus

Figure 1:
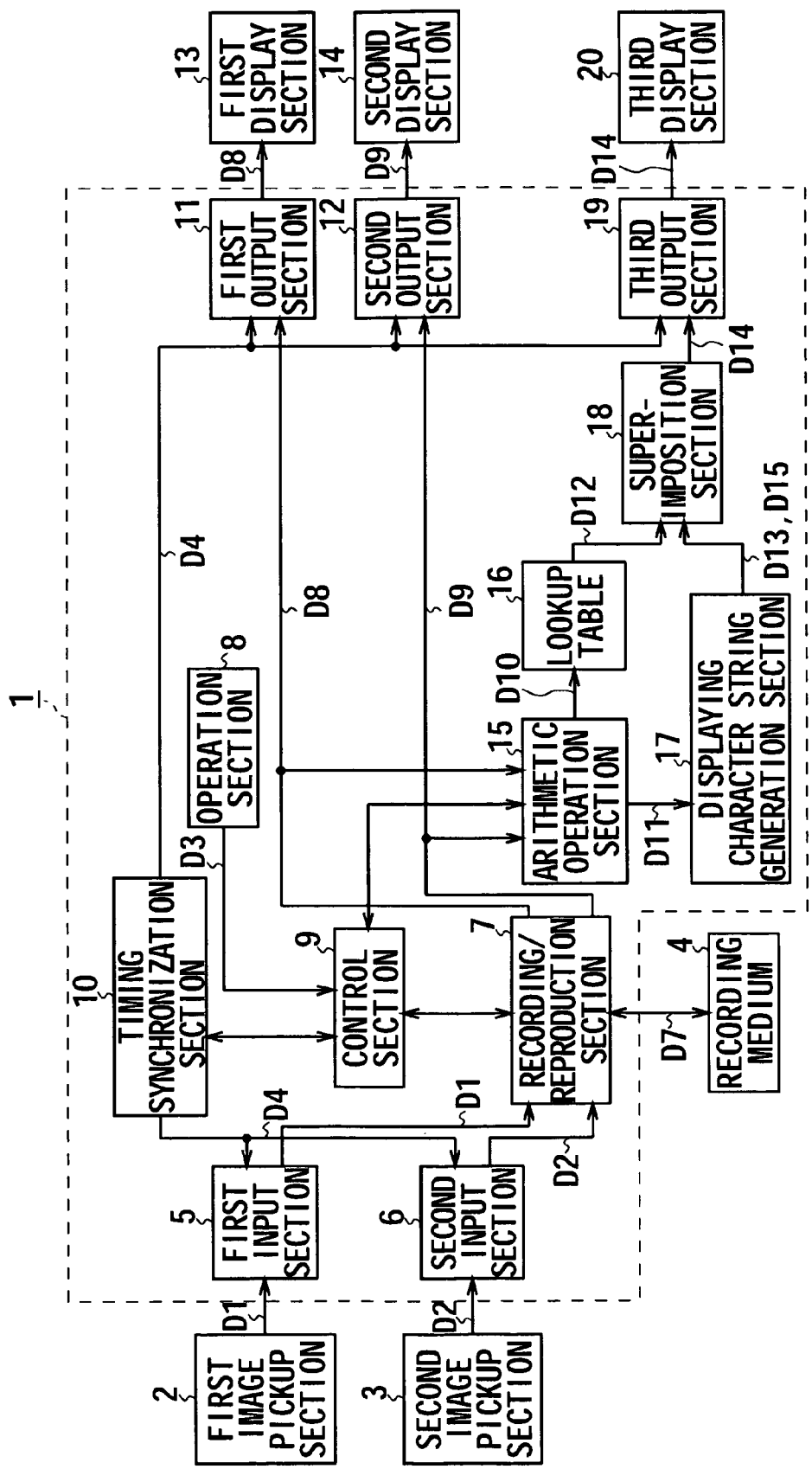
FIG. 1 is a schematic block diagram of an embodiment of recording/reproduction apparatus according to one embodiment of the invention.

FIG. 1 is a schematic block diagram of an embodiment of the present invention, which is a portable type recording/reproduction apparatus that is denoted generally by reference symbol 1. The embodiment is adapted to record video data of a plurality of video signals input by way of a first image pickup section 2 and a second image pickup section 3 on a recording medium 4, which is typically a magnetic tape, and reproduce video data of a plurality of video signals from the recording medium 4 and output them.

More specifically, the first image pickup section 2 converts the video signals showing an analog waveform obtained by converting an optical image of an object into electric signals into digital signals at a predetermined sampling rate and the first video data D1 obtained as a result of the conversion are sent out to a first input section 5 in the recording/reproduction apparatus 1. The second image pickup section 3 executes an analog/digital conversion process similar to that of the above-described first image pickup section 2 and sends out the second video data D2 obtained as a result of the conversion process to a second input section 6 in the recording/reproduction apparatus 1.

The first input section 5 sends out the first video data D1 supplied from the first image pickup section 2 to a recording/reproduction section 7 typically at a transfer rate of 440 Mbps. Like the above-described first input section 5, the second input section 6 sends out the second video data D2 also to the recording/reproduction section 7 typically at a transfer rate of 440 Mbps.

Meanwhile, the recording/reproduction apparatus 1 includes an operation section 8 having a recording button, a reproduction button, a stop button as well as a menu button to be used for various setting operations, a jog lever for selecting a setting operation from the menu and a plurality of video arithmetic operation buttons so that, as any of the operation buttons are operated in the operation section 8, the latter sends out corresponding operation data D3 to the control section 9.

The control section 9 is constituted by a microcomputer including a Central Processing Unit (CPU) that entirely controls the recording/reproduction apparatus 1, a Read Only Memory (ROM) that stores various control programs and a Random Access Memory (RAM) that operates as working memory of the CPU, although these components are not illustrated in the drawings. For example, as the recording button of the operation section 8 is operated and the operation data D3 that corresponds to the recording button is supplied to the control section 9, the latter controls timing synchronization section 10 to generate timing synchronization data D4 at the timing synchronization section 10 and sends out the generated timing synchronization data D4 to the first input section 5 and the second input section 6.

As a result, in the recording/reproduction apparatus 1, the first video data D1 and the second video data D2 supplied respectively from the first image pickup section 2 and the second image pickup section 3 are synchronized according to the timing synchronization data D4 and simultaneously sent out to the recording/reproduction section 7.

Figure 2:
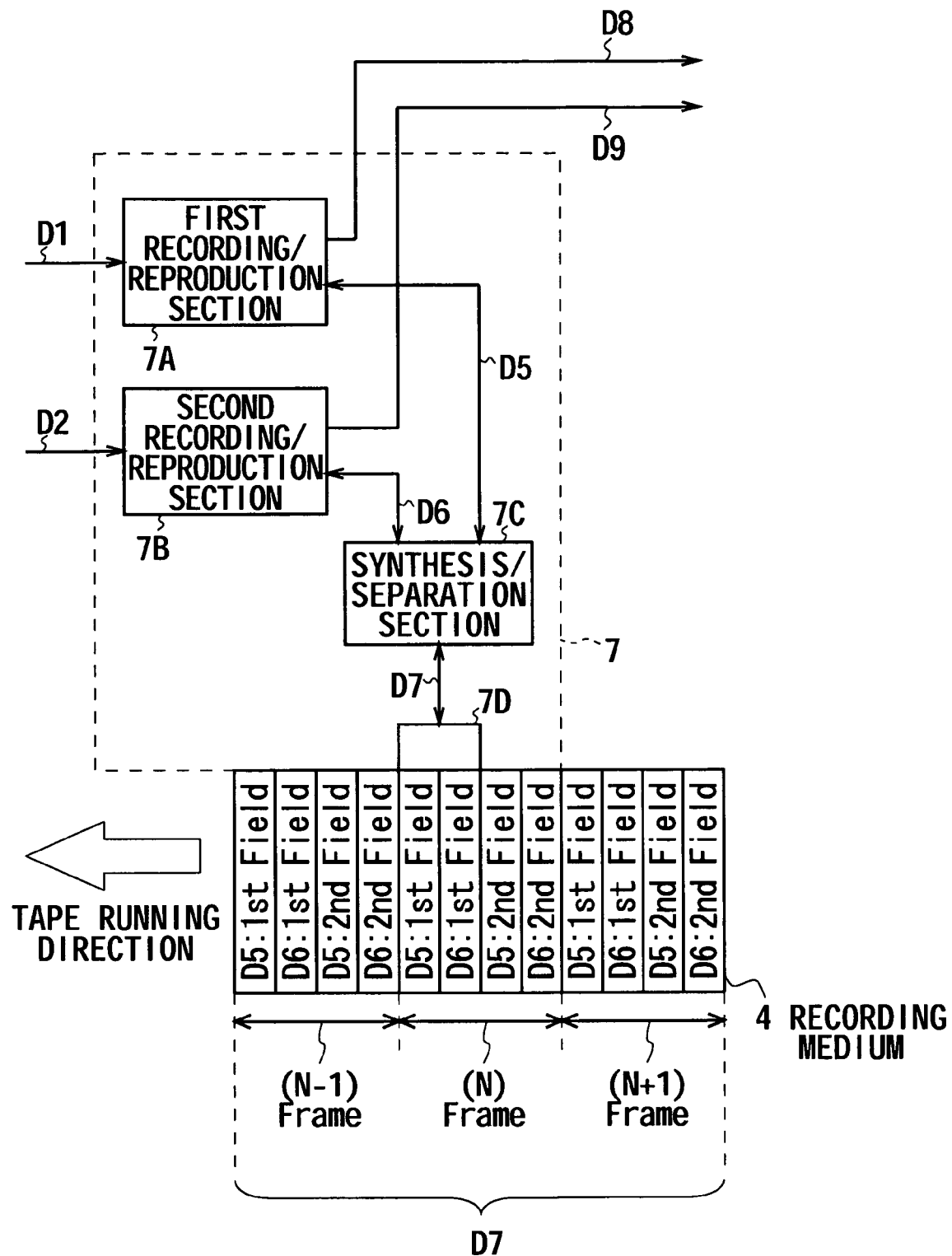
FIG. 2 is a schematic conceptual illustration of the recording/reproduction process of the recording/reproduction section.

As shown in FIG. 2, the recording/reproduction section 7 includes a first recording/reproduction section 7A, a second recording/reproduction section 7B, a synthesis/separation section 7C and a single magnetic head 7D. The first recording/reproduction section 7A does compression coding on the first video data D1 according to a predetermined compression coding standard such as the Moving Picture Experts Group phase 2 (MPEG 2) and sends out the obtained first video coded data D5 to the synthesis/separation section 7C. Like first recording/reproduction section 7A, the second recording/reproduction section 7B executes a compression coding process on the second video data D2 and sends out the obtained second video coded data D6 to the synthesis/separation section 7C.

The synthesis/separation section 7C synthetically combines the first video coded data D5 and the second video coded data D6 supplied simultaneously and respectively from the first recording/reproduction section 7A and the second recording/reproduction section 7B on a field by field basis and simultaneously records the obtained synthesized video coded data D7 on the recording medium that is driven in a predetermined direction at a running speed that typically corresponds to 880 Mbps by way of the magnetic head 7D.

More specifically, for instance, the synthesis/separation section 7C simultaneously records an odd-numbered field (1st Field) of the (N-1)-th frame ((N-1) Frame) of the first video coded data D5 and an odd-numbered field (1st Field) of the (N-1)-th frame ((N-1) Frame) of the second video coded data D6 out of the synthesized video coded data D7 on the recording medium 4 and subsequently it simultaneously records an even-numbered field (2nd Field) of the (N-1)-th frame ((N-1) Frame) of the first video coded data D5 and an even-numbered field (2nd Field) of the (N-1)-th frame ((N-1) Frame) of the second video coded data D6 on the recording medium 4.

Then, the synthesis/separation section 7C simultaneously records an odd-numbered field (1st Field) of the N-th frame ((N) Frame) of the first video coded data D5 and an odd-numbered field (1st Field) of the N-th frame ((N Frame) of the second video coded data D6 on the recording medium 4. In this way, the synthesis/separation section 7C sequentially records the synthesized video coded data D7 given to it thereafter on the recording medium 4.

On the other hand, as shown in FIG. 1, as the reproduction button of the operation section 8 is operated and the operation data D3 that corresponds to the reproduction button is supplied to the control section 9, the latter controls the recording/reproduction section 7 so as to have it read out the synthesized video coded data D7 recorded on the recording medium 4.

More specifically, for instance, the synthesis/separation section 7C of the recording/reproduction section 7 simultaneously reads out an odd-numbered field (1st Field) of the (N-1)-th frame ((N-1) Frame) of the first video coded data D5 and an odd-numbered field (1st Field) of the (N-1)-th frame ((N-1) Frame) of the second video coded data D6 from the recording medium 4. Thereafter, the synthesis/separation section 7C sequentially reads out the remaining synthesized video coded data D7 from the recording medium 4 in this way.

Then, the synthesis/separation section 7C separates the odd-numbered field (1st Field) of the (N-1)-th frame ((N-1) Frame) of the first video coded data D5 and the odd-numbered field (1st Field) of the (N-1)-th frame ((N-1) Frame) of the second video coded data D6 read out simultaneously from the recording medium 4 from each other. In this way, the synthesis/separation section 7C sequentially separates the first video coded data D5 and the second video coded data D6 from the remaining synthesized video coded data D7 to restore the first video coded data D5 and the second video coded data D6. Then, it sends out the first video coded data D5 and the second video coded data D6 respectively to the first recording/reproduction section 7A and the second recording/reproduction section 7B.

The first recording/reproduction section 7A decodes the first video coded data D5 according to the decoding standard that matches the first video coded data D5 and outputs the obtained first video decoded data D8 to the first display section 13 (FIG. 1) that is typically constituted by a high resolution color liquid crystal display by way of the first output section 11 (FIG. 1). Like the first recording/reproduction section 7A, the second recording/reproduction section 7B executes a decoding process on the second video coded data D6 and outputs the obtained second video decoded data D9 to the second display section 14 that is similar to the first display section 13 by way of the second output section 12 as shown in FIG. 1.

As a result, in the recording/reproduction apparatus 1, the first image according to the first video decoded data D8 is displayed on the first display section 13, while the second image according to the second video decoded data D9 is displayed on the second display section 14.

In addition to the above-described components, the recording/reproduction apparatus 1 further includes an arithmetic operation section 15, a lookup table (Look Up Table) 16, a displaying character string generation section 17, an superimposition section 18 and a third output section 19 so that the first video decoded data D8 and the second video decoded data D9 supplied from the recording/reproduction section 7 are also transmitted to the arithmetic operation section 15.

At this time, as a certain video arithmetic operation button is operated out of the plurality of video arithmetic operation buttons in the operation section 8 and an operation data D3 that corresponds to the operated video arithmetic operation button is supplied, the control section 9 controls the arithmetic operation section 15 so as to have the latter execute a predetermined arithmetic process on the first video decoded data D8 and the second video decoded data D9 supplied from the recording/reproduction section 7 and sends out the arithmetic video data D10 obtained as a result to the lookup table 16.

Additionally, the control section 9 generates an arithmetic method indicating data D11 that indicates the arithmetic operations corresponding to operation performed on the video arithmetic operation button and sends out the arithmetic method indicating data D11 to the displaying character string generation section 17.

The lookup table 16 executes various data conversion processes such as color conversion and image conversion on the arithmetic video data D10 by means of a corresponding table and sends out the converted arithmetic video data D12 obtained as a result to the superimposition section 18.

The displaying character string generation section 17 generates a predetermined displaying character string data D13 for indicating the character string that corresponds to the operation performed on the video arithmetic operation button according to the arithmetic method indicating data D11 and sends out the displaying character string data D13 to the superimposition section 18.

The superimposition section 18 executes a superimposition process, such as a superimposing on the converted arithmetic video data D12 supplied from the lookup table 16 and the displaying character string data D13 supplied from the displaying character string generation section 17 and outputs the superimposed arithmetic video data D14 obtained as a result to the third display section 20 having a configuration similar to the first display section 13 by way of the third output section 19. Then, as a result, in the recording/reproduction apparatus 1, a superimposed arithmetic image formed on the basis of the superimposed arithmetic video data D14 is displayed on the third display section 20.

Note that, in the recording/reproduction apparatus 1, the first display section 13, the second display section 14 and the third display section 20 can be connected to each other and disconnected from each other freely depending on the recording environment.

Then, the control section 9 controls the timing synchronization section 10 so as to have it generate timing synchronization data D4 and sends out the timing synchronization data D4 to the first output section 11, the second output section 12 and the third output section 19.

As a result, in the recording/reproduction apparatus 1, it is possible to output the first video decoded data D8 and the second video decoded data D9 supplied from the recording/reproduction section 7 and the superimposed arithmetic video data D14 supplied from the superimposition section 18 simultaneously and respectively to the first display section 13, the second display section 14 and the third display section 20 by synchronizing the first video decoded data D8, the second video decoded data D9 and the superimposed arithmetic video data D14 according to the timing synchronization data D4.

In this way, in the recording/reproduction apparatus 1, it is no longer necessary to use a first display section 13 for display a first image, a second display section 14 for displaying a second image and so on because the superimposed arithmetic video data D14 generated by superimposing the converted arithmetic video data D12 obtained as a result of arithmetic operations performed on the first video decoded data D8 and the second video decoded data D9 and the displaying character string data D13 are output to the third display section 20. In other words, it is possible to allow the user to visually confirm the superimposed arithmetic image formed by superimposing the converted arithmetic video data D12 that indicates the outcome of arithmetic operations and the displaying character string data D13 that indicates the arithmetic method simply by outputting the superimposed arithmetic video data D14 to the third display section 20 as outcome of arithmetic operations.

(2) Various Control Process Sequences of Recording/Reproduction Apparatus 1

Now, the sequences of various control processes executed by the recording/reproduction apparatus 1 will be described below.

(2-1) Output Switching Control Process Sequence

Figure 3:
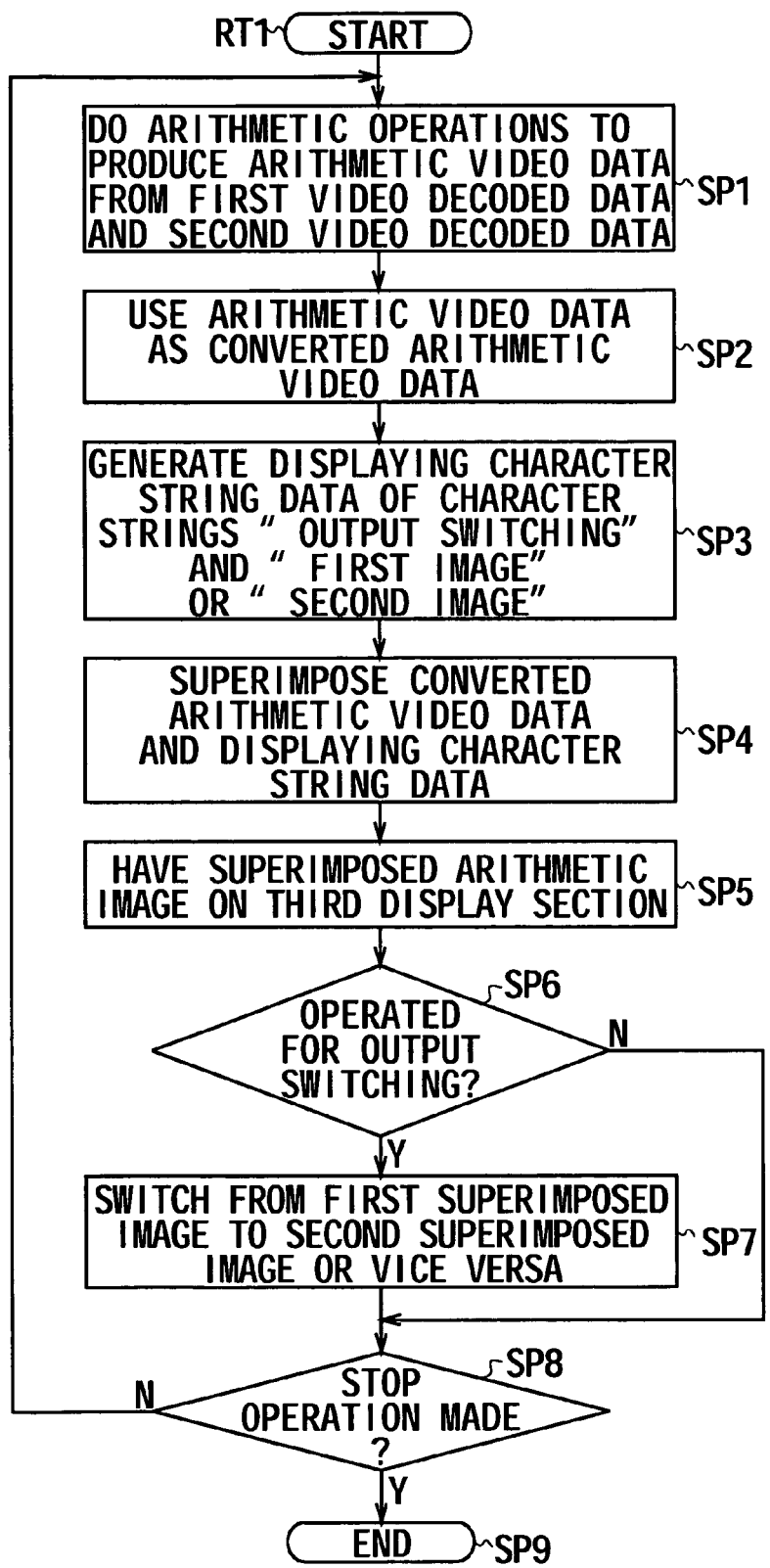
FIG. 3 is a flowchart of the sequence of the output switching control process.

The output switching control process sequence for sequentially displaying the superimposed arithmetic image according to the super imposed arithmetic video data D14, the first super imposed image corresponding to the first video decoded data D8 and the second superimposed image corresponding to the second video decoded data D9 on the third display section 20 in a switched manner in the recording/reproduction apparatus 1 will described below by referring to the flowchart of FIG. 3.

As the output switching button in the video arithmetic operation buttons of the operation section 8 is operated and the operation data D3 that corresponds to the output switching button is supplied, the control section 9 of the recording/reproduction apparatus 1 shifts its mode of operation to an output switching mode and executes an output switching control process according to the output switching control program stored in advance in the ROM (not shown) of the control section 9. The sequence of the output switching control process starts from the starting step of Routine RT1 that is followed by the next step, or Step SP1.

In Step SP1, the control section 9 of the recording/reproduction apparatus 1 performs an arithmetic operation to make formula 1 shown below hold true by means of the arithmetic operation section 15:

$$f(A, B) = A \text{ or } B \tag{1},$$

where A represents the first video decoded data D8 and B represents the second video decoded data D9, while f (A, B) is a function having two variables of A and B and "A or B" indicates that either A or B is output.

In other words, the control section 9 produces either of the first video decoded data D8 and the second video decoded data D9 that are input to it as arithmetic video data D10 and moves to the next step, or Step SP2. Note that the control section 9 is initialized so as to produce the first video decoded data D8 as arithmetic video data D10.

In Step SP2, the control section 9 of the recording/reproduction apparatus 1 converts the arithmetic video data D10 on the lookup table 16 so as to make formula 2 shown below hold true:

$$f'(A, B) = f(A, B) \tag{2}.$$

In this instance, the control section 9 simply uses the arithmetic video data D10 as converted arithmetic video data D12 and moves to the next step, or Step SP3.

In Step SP3, the control section 9 of the recording/reproduction apparatus 1 generates displaying character string data D13 for a character string of "output switching" and displaying character string data D13 for a character string of "the first image" or "the second image" according to the arithmetic method indicating data D11 generated by the displaying character string generation section 17 in response to the operation of the output switching button and then moves to the next step, or Step SP4.

In Step SP4, the control section 9 of the recording/reproduction apparatus 1 superimposes the converted arithmetic video data D12 and the displaying character string data D13 by means of the superimposing section 18. More specifically, the control section 9 generates superimposed arithmetic video data D14 by superimposing the displaying character string data D13 of "the first image" and "output switching" on the data that corresponds to the first video decoded data D8 in the converted arithmetic video data D12 or superimposing the displaying character string data D13 of "the second image" and "output switching" onto the data that corresponds to the second video decoded data D9 in the converted arithmetic video data D12 and then moves to the next step, or Step SP5.

Figure 4:
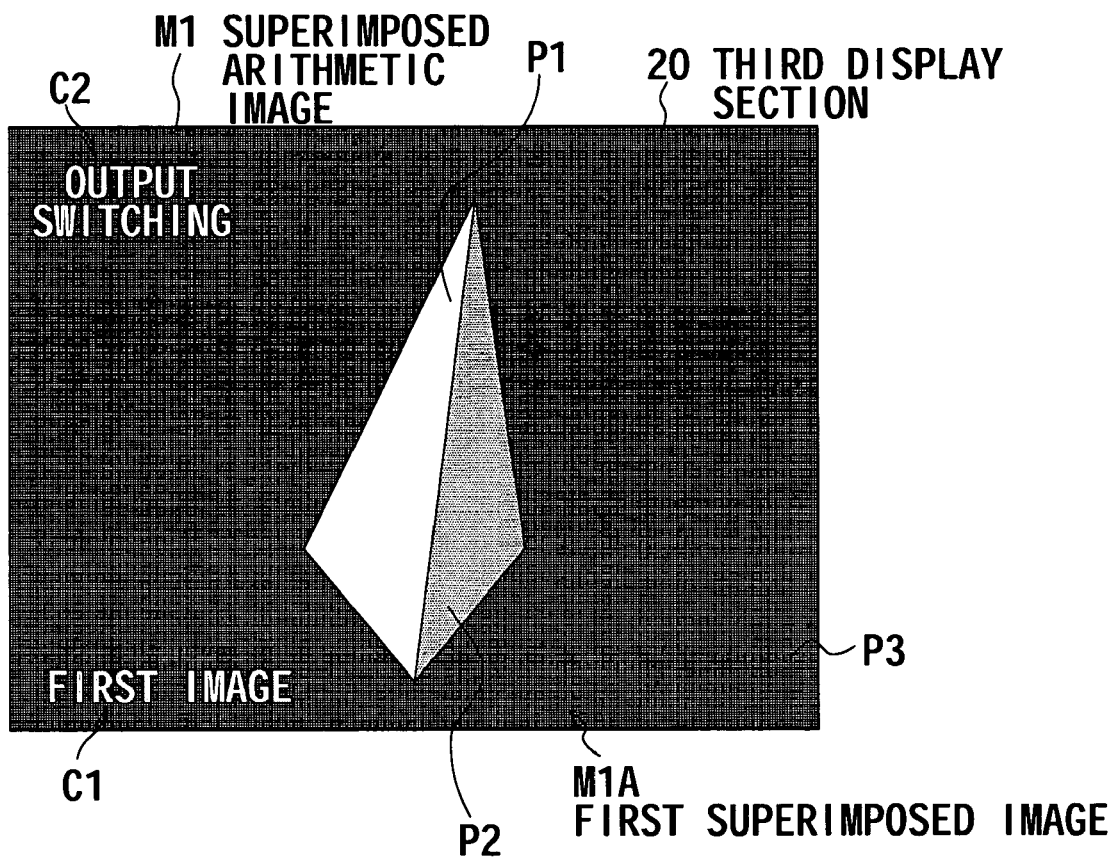
FIG. 4 shows a schematic conceptual image that can be displayed in the third display section in the output switching control process.

In Step SP5, the control section 9 of the recording/reproduction apparatus 1 outputs the superimposed arithmetic video data D14 to the third display section 20 by means of the third output section 19 and has the third display section 20 display an superimposed arithmetic image M1 according to the superimposed arithmetic video data D14 as shown in FIG. 4.

More specifically, the control section 9 is initialized to have the third display section 20 display the first superimposed image M1A according to the first video decoded data D8. At this time, the control section 9 superimposes the first video displaying character string C1, which is a character string of "the first image" according to the displaying character string data D13, on a lower left part of the first superimposed image M1A and the output switching displaying character string C2, which is a character string of "output switching" according to the displaying character string data D13, on an upper left part of the first superimposed image M1A as shown in FIG. 4. In this way, the control section 9 has the third display section 20 display the first superimposed image M1A and moves to the next step, or Step SP6.

Note that, referring to FIG. 4, if 256 tones from "0" to "255" are used for the luminance levels of pixels, the white part P1 shows luminance level "255" and the first hatched part P2 shows luminance level "223", while the second hatched part P3 shows luminance level "0".

In Step SP6, the control section 9 of the recording/reproduction apparatus 1 determines if the output switching button is operated thereafter and operation data D3 that corresponds to the output switching button is supplied or not. The control section 9 proceeds to Step SP8 when it is determined that the output switching button is not operated, whereas it proceeds to the next step, or Step SP7, when it is determined that the output switching button is operated.

Figure 5:
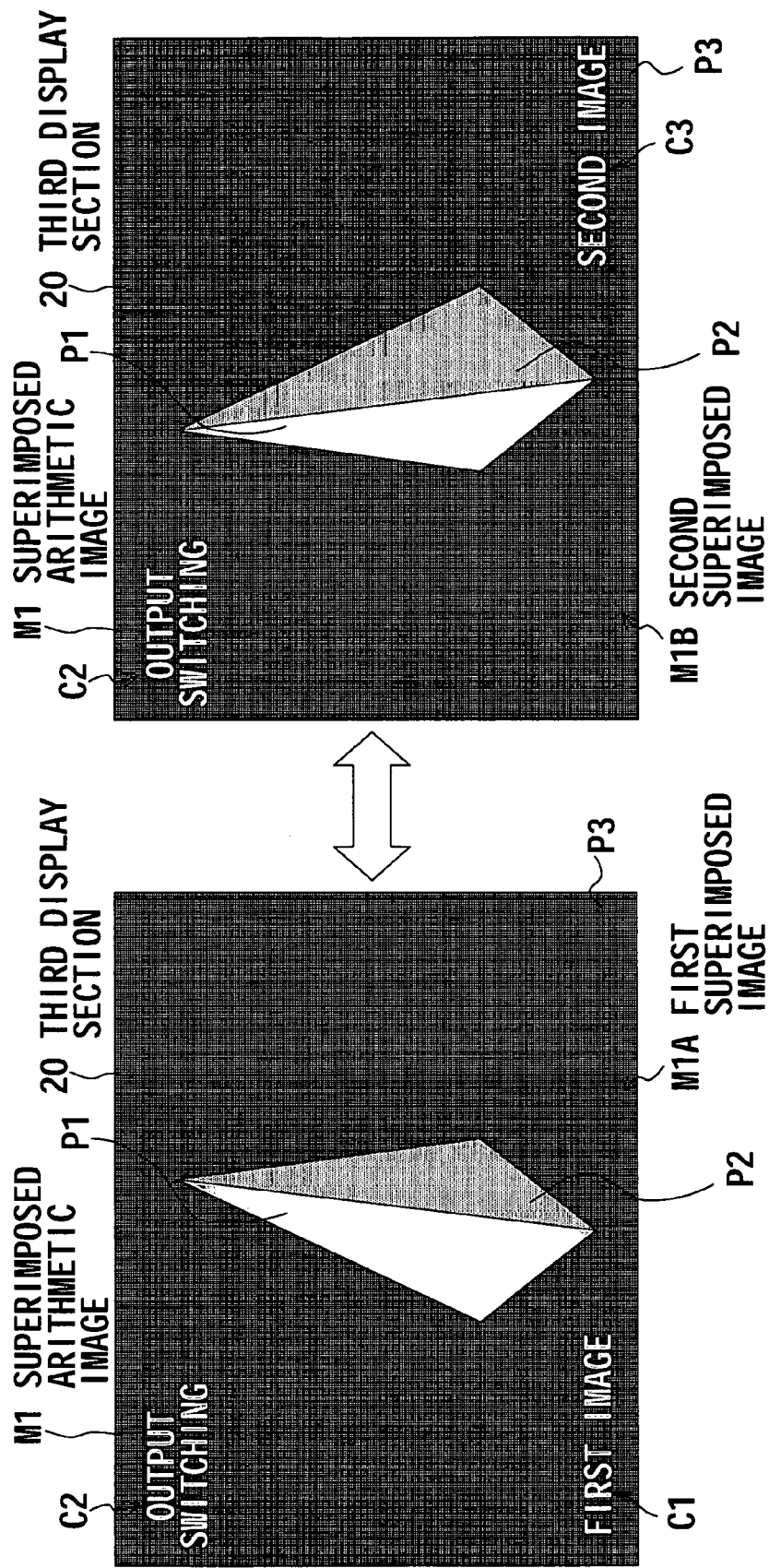
FIGS. 5A and 5B show schematic conceptual images that can be displayed before and after a display switching operation in the output switching control process.

Referring to FIGS. 5A and 5B, when it is determined that the output switching button of the operation section 8 is operated, in Step SP7, the control section 9 of the recording/reproduction apparatus 1 switches the image being displayed on the third display section 20 from the first superimposed image M1A as shown in FIG. 5A to the second superimposed image M1B according to the second video decoded data D9 as shown in FIG. 5B or from the second superimposed image M1B to the first superimposed image M1A and then moves to the next step, or Step SP8.

At this time, the control section 9 superimposes the second video displaying character string C3, which is a character string of "the second image" according to the displaying character string data D13, on a lower right part of the second superimposed image M1B and the output switching displaying character string C2, on an upper left part of the second superimposed image M1B as shown in FIG. 5B.

Thus, since the first video displaying character string C1 is superimposed on the first superimposed image M1A and the second video displaying character string C3 on the second superimposed image M1B in this way, the recording/reproduction apparatus 1 can have the user visually confirm them without mistaking the first superimposed image M1A for the second superimposed image M1B or vice versa. Additionally, since the output switching displaying character string C2 is superimposed on both the first superimposed image M1A and the second superimposed image M1B, the recording/reproduction apparatus 1 can have the user visually confirm them without mistaking the output switching mode for some other mode.

In Step SP8, the control section 9 of the recording/reproduction apparatus 1 determines if the stop button of the operation section 8 is operated and operation data D3 that corresponds to the stop button is supplied or not. The control section 9 returns to Step SP1 when it is determined that the stop button is not operated, whereas it moves to the next step, or Step SP9, where it ends the process.

(2-2) Wiping Control Process Sequence

Figure 6:
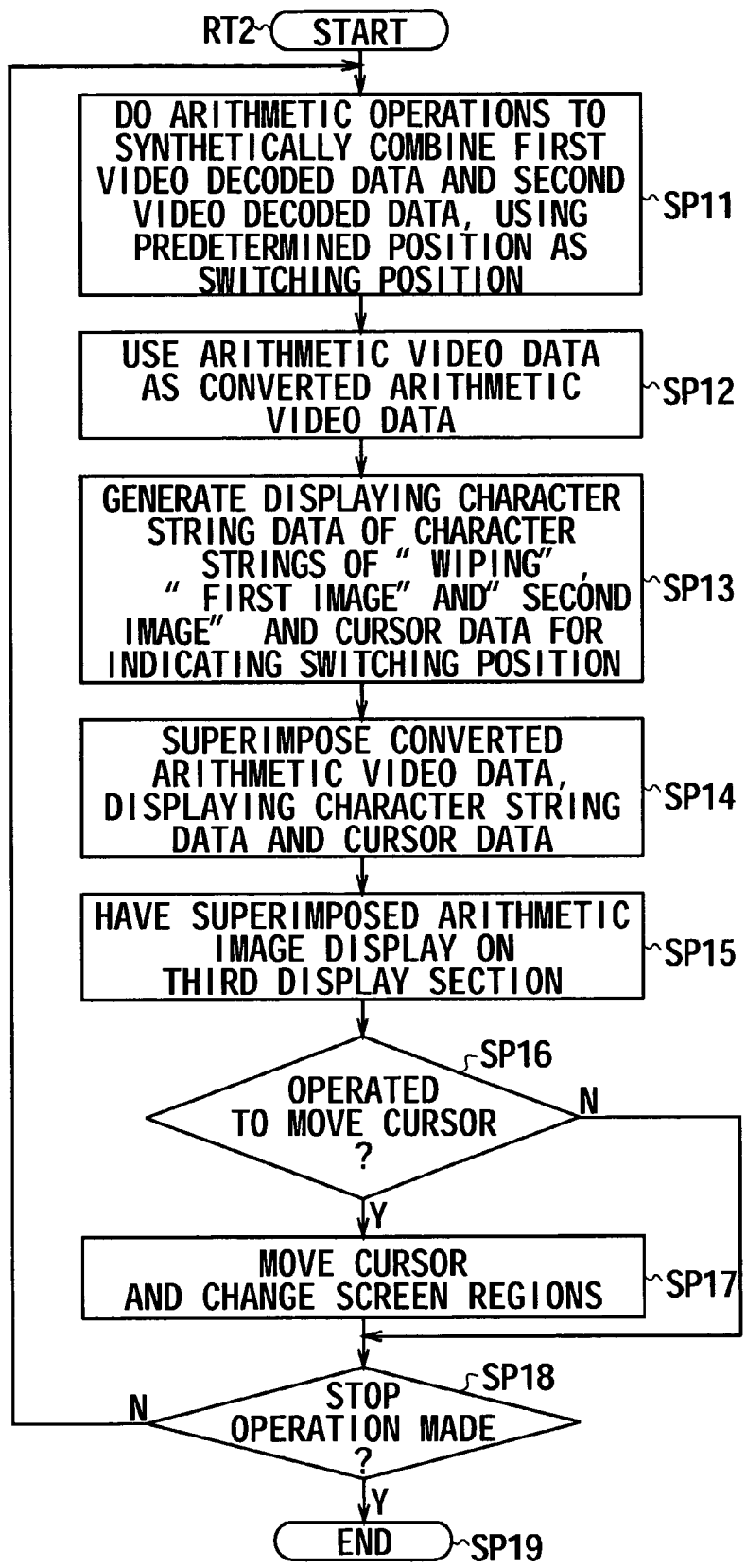
FIG. 6 is a flowchart of the sequence of the wiping control process.

Now, the wiping control process sequence for displaying the left half of the first superimposed image in a left side region of the third display section 20 and the half of the second superimposed image in a right side region of the third display section 20 will be described below by referring to the flowchart of FIG. 6. In the recording/reproduction apparatus 1, the left side region and the right side region of the third display section 20 are defined by a partition arranged at a predetermined position on the third display section 20.

As the wipe button in the video arithmetic operation buttons of the operation section 8 is operated and operation data D3 that corresponds to the wipe button is supplied, the control section 9 of the recording/reproduction apparatus 1 shifts its mode of operation to a wipe mode and executes a wiping control process according to the wiping control program stored in advance in the ROM (not shown) of the control section 9. The sequence of the wiping process starts from the starting step of Routine RT2 that is followed by the next step, or Step SP11.

In Step SP11, the control section 9 of the recording/reproduction apparatus 1 performs a synthetic arithmetic operation to make formula 3 shown below hold true by means of the arithmetic operation section 15:

$$f(A, B) = g(A, m-x) + g(B, x-m) \quad (3),$$

where A represents the first video decoded data D8 and B represents the second video decoded data D9, while M represents the horizontal length of the display screen of the third display section 20, m represents the horizontal position of the partition separating the first video decoded data D8 and the second video decoded data D9 and x represents the horizontal positional coordinate ($0 \leq x \leq M$).

In the above formula, g (A, m−x) indicates that a display screen region is used for A when (m−x) is larger than "0" but no display screen region is used for A when (m−x) is not greater than 0. Similarly, g (B, x−m) indicates that a display screen region is used for B when (m−x) is larger than "0" but no display screen region is used for B when (m−x) is not greater than 0. In other words, the display screen region located left relative to the partition position m is dedicated to the first video decoded data D8 and the display screen region located right relative to the partition position m is dedicated to the second video decoded data D9.

Thus, the control section 9 generates arithmetic video data D10 by performing synthetic arithmetic operations on the first video decoded data D8 and the second video decoded data D9, using a predetermined partition position and then moves to the next step, or Step SP12.

In Step SP12, the control section 9 of the recording/reproduction apparatus 1 converts the arithmetic video data D10 on the lookup table 16 so as to make formula 4 shown below hold true:

$$f'(A, B) = f(A, B) \quad (4).$$

In this instance, the control section 9 simply uses the arithmetic video data D10 as converted arithmetic video data D12 and moves to the next step, or Step SP13.

In Step SP13, the control section 9 of the recording/reproduction apparatus 1 generates displaying character string data D13 for character strings of "the first image", "the second image" and "wipe" according to the arithmetic method indicating data D11 generated according to the operation of the wipe button and also cursor data D15 (FIG. 1) for indicating the position of the partition that separates the first video decoded data D8 and the second video decoded data D9. Then, it moves to the next step, or Step SP14.

In Step SP14, the control section 9 of the recording/reproduction apparatus 1 superimposes the converted arithmetic video data D12, the displaying character string data D13 and the cursor data D15 by means of the superimposing section 18. More specifically, the control section 9 generates superimposed arithmetic video data D14 by superimposing the displaying character string data D13 of the character strings "the first image" and "wipe" onto the data that corresponds to the first video decoded data D8 in the converted arithmetic video data D12, the displaying character string data D13 of "the second image" on the data that corresponds to the second video decoded data D9 and the cursor data D15 on the partition position separating the data corresponding to the first video decoded data D8 and the data corresponding to the second video decoded data D9 and then moves to the next step, or Step SP15.

Figure 7:
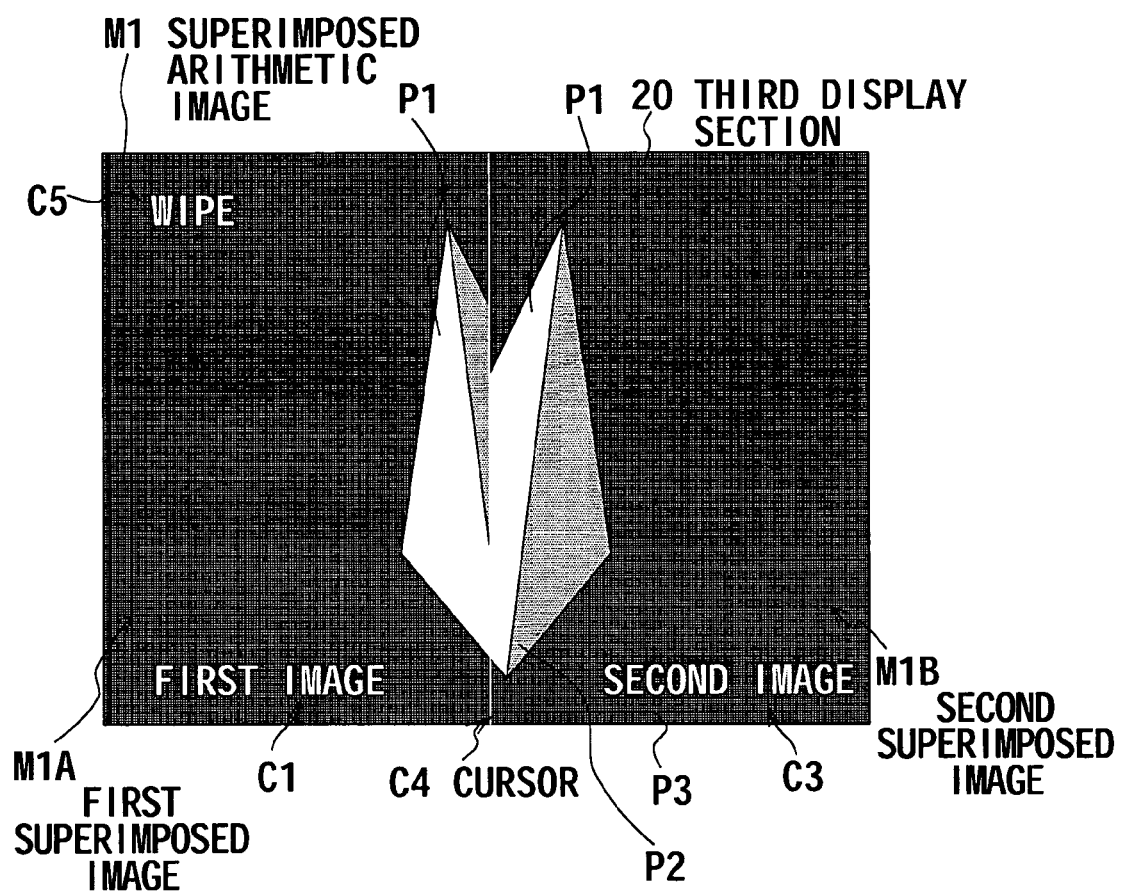
FIG. 7 shows a schematic conceptual image that can be displayed in the third display section in the wiping control process.

In Step SP15, the control section 9 of the recording/reproduction apparatus 1 outputs the superimposed arithmetic video data D14 to the third display section 20 by means of the third output section 19 and has the third display section 20 display an superimposed arithmetic image M1 according to the superimposed arithmetic video data D14 as shown in FIG. 7. Then, it moves to the next step, or Step SP16.

More specifically, the control section 9 is initialized to have the third display section 20 display the left half of the first superimposed image M1A and the right half of the second superimposed image M1B simultaneously using the cursor C4 as partition in the screen region of the third display section 20 according to the cursor data D15.

At this time, the control section 9 superimposes the first video displaying character string C1 on a lower part of the first superimposed image M1A, the wipe displaying characteristic string C5, which is a character string of "wipe" according to the displaying character string D13 on an upper part of the first superimposed image M1A and the second video displaying character string C3 on a lower part of the second superimposed image M1B as shown in FIG. 7.

In Step SP16, the control section 9 of the recording/reproduction apparatus 1 determines if the jog lever of the operation section 8 is operated leftward or rightward during the wiping control process and operation data D3 that corresponds to the jog lever is supplied or not. The control section 9 proceeds to Step SP18 when it is determined that the jog lever is not operated, whereas it proceeds to the next step, or Step SP17, when it is determined that the jog lever is operated.

Figure 8:
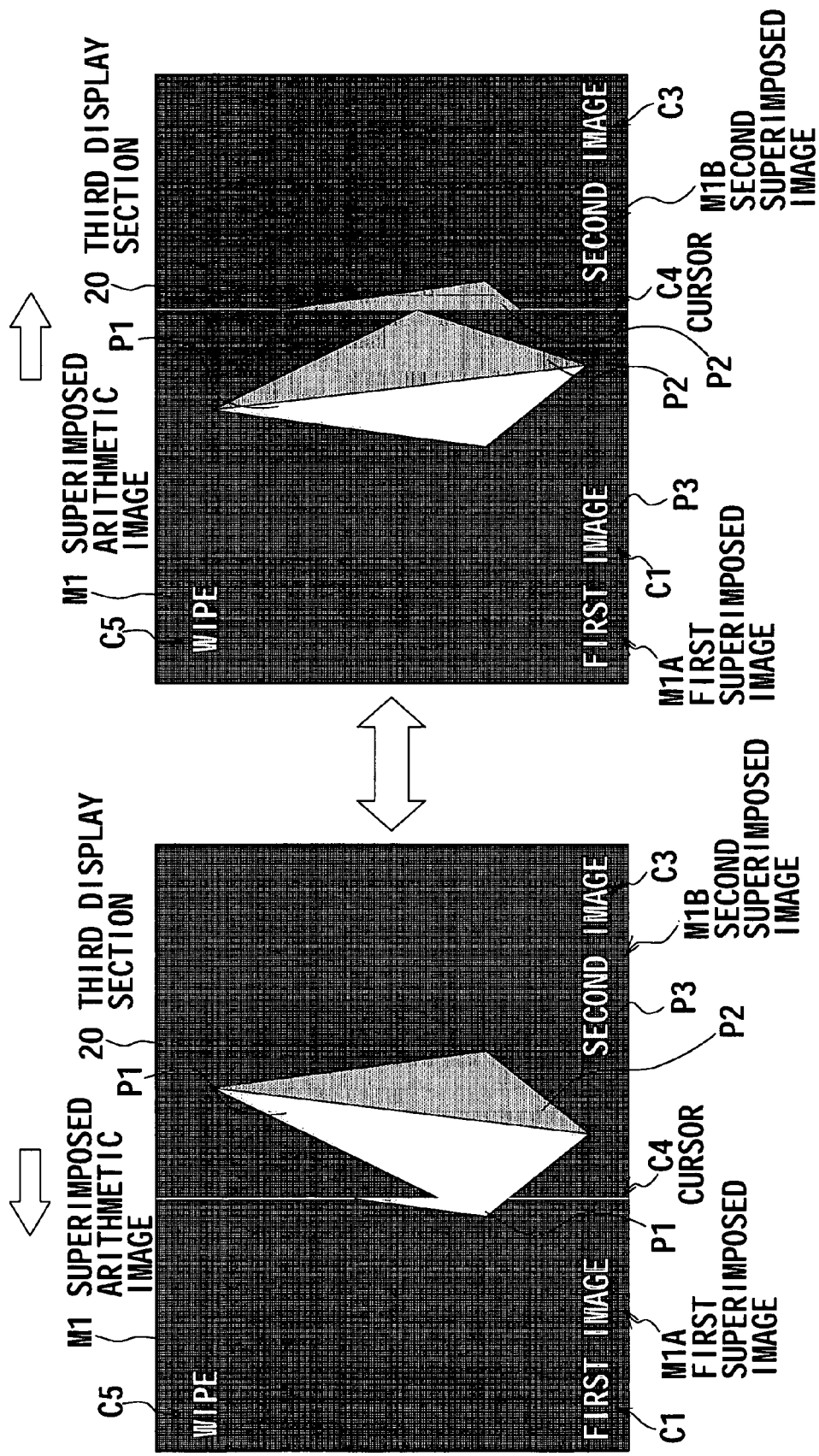
FIGS. 8A and 8B show schematic conceptual images that can be displayed by a cursor move in the wiping control process.

When it is determined that the jog lever is operated leftward, in Step SP17, the control section 9 of the recording/reproduction apparatus 1 shifts the position of the cursor C4 on the third display section 20 so as to reduce the size of the first superimposed image M1A in the left side part and enlarge the size of the second superimposed image M1B in the right side part as shown in FIG. 8A. When, on the other hand, it is determined that the jog lever is operated rightward, the control section 9 of the recording/reproduction apparatus 1 shifts the position of the cursor C4 on the third display section 20 so as to enlarge the size of the first superimposed image M1A in the left side part and reduce the size of the second superimposed image M1B in the right side part as shown in FIG. 8B. Then, it moves to the next step, or Step SP18.

At this time, since the cursor C4 is superimposed between the first superimposed image M1A and the second superimposed image M1B, the recording/reproduction apparatus 1 can have the user visually recognize the position of the partition separating the first superimposed image M1A and the second superimposed image M1B and also intuitively recognize that the left side part of the cursor C4 is the first superimposed image M1A and the right side part of the cursor C4 is the second superimposed image M1B.

In Step SP18, the control section 9 of the recording/reproduction apparatus 1 determines if the stop button of the operation section 8 is operated and operation data D3 that corresponds to the stop button is supplied or not. The control section 9 returns to Step SP11 when it is determined that the stop button is not operated, whereas it moves to the next step, or Step SP19, where it ends the process.

With conventional recording/reproduction apparatus, a plurality of display sections including the first display section 13 for displaying the first image and the second display section 14 for displaying the second image have to be provided and the user is required to do complex and cumbersome adjusting operations such as adjusting the color tones of the plurality of display sections to make them uniform when the user wants to compare a plurality of images.

To the contrary, with the recording/reproduction apparatus 1 of this embodiment, the left half of the first superimposed image M1A and the right half of the second superimposed image M1B are displayed at the same time by using the cursor C4 as partition so that it is possible for the user to visually confirm the left half of the first superimposed image M1A and the right half of the second superimposed image M1B simply by viewing the single third display section 20 and hence to instantaneously compare the first superimposed image M1A and the second superimposed image M1B for the difference of color tone.

Additionally, with the recording/reproduction apparatus 1 of this embodiment, the display screen region of the first superimposed image M1A and that of the second superimposed image M1B can be changed by shifting the cursor C4 separating the first superimposed image M1A and the second superimposed image M1B so that it is possible for the user to visually confirm the difference of color tone between the part of the image that is displayed before the shift of the cursor C4 and the part of the image that is displayed after the shift of the cursor C4 with ease.

(2-3) Stereoscopic Image Visual Effects Confirmation Process Control Sequence

It is assumed for the above description that the first image pickup section 2 and the second image pickup section 3 are separated from each other by a distance that corresponds to the distance separating the left eye and the right eye of human being and is appropriately determined as a function of the distance between the object that is being imaged and the image pickup sections and that the first image pickup section 2 and the second image pickup section 3 are arranged in parallel with each other so that the first video data D1 obtained by the first image pickup section 2 is used as left eye video data D1 while the second video data D2 obtained by the second image pickup section 3 is used as right eye video data D2.

Figure 9:
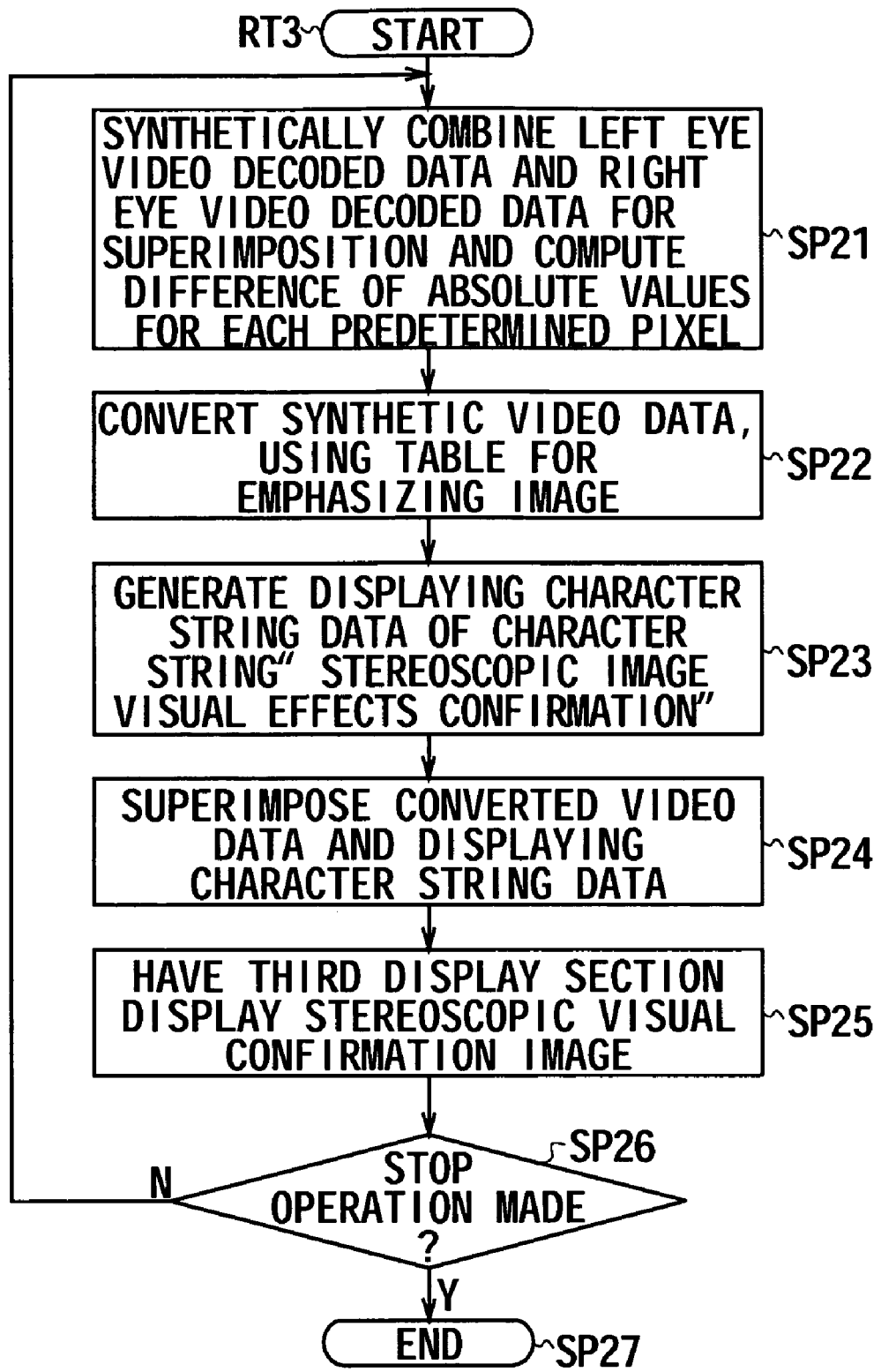
FIG. 9 is a flowchart of the stereoscopic image visual effects confirmation control process.

On the above-described assumption, the stereoscopic image visual effects confirmation process control sequence for confirming the visual effects of a stereoscopic image by using the left eye video data D1 and the right eye video data D2 of the recording/reproduction apparatus 1 will be described below by referring to the flowchart of FIG. 9.

As the stereoscopic image visual effects confirmation button in the video arithmetic operation buttons is operated and operation data D3 that corresponds to the stereoscopic image visual effects confirmation button is supplied, the control section 9 of the recording/reproduction apparatus 1 shifts its mode of operation to a stereoscopic image visual effects confirmation mode and executes a stereoscopic image visual effects confirmation control process according to the stereoscopic image visual effects confirmation control program stored in advance in the ROM (not shown) of the control section 9. The sequence of the stereoscopic image visual effects confirmation control process starts from the starting step of Routine RT3 that is followed by the next step, or Step SP21.

In Step SP21, the control section 9 of the recording/reproduction apparatus 1 performs a synthetic arithmetic operation to make formula 5 shown below hold true by means of the arithmetic operation section 15:

$$f(A, B) = ABS(A-B) \qquad (5),$$

where A represents left eye video decoded data D8 based on the left eye video data D1 and B represents the right eye video decoded data D9.

This means that the left eye video decoded data D8 and the right eye video decoded data D9 input to it are synthetically combined for superimposition and the absolute value of the difference between the values of the two data for each predetermined pixel is computationally determined. In other words, the control section 9 performs a synthetic arithmetic operation on the left eye video decoded data D8 and the right eye video decoded data D9 to generate synthetic video data D10. Then, the control section 9 moves to the next step, or Step SP22.

Figure 10:
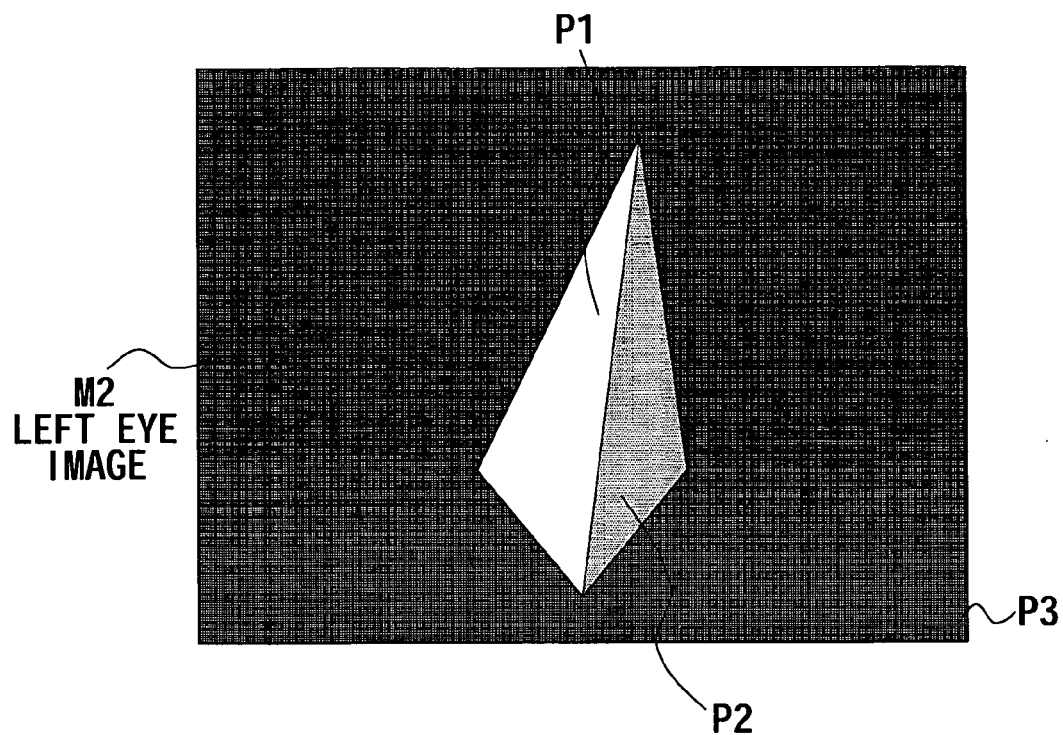
FIG. 10 shows a schematic conceptual image that can be displayed as left eye image in the stereoscopic image visual effects confirmation control process.
Figure 11:
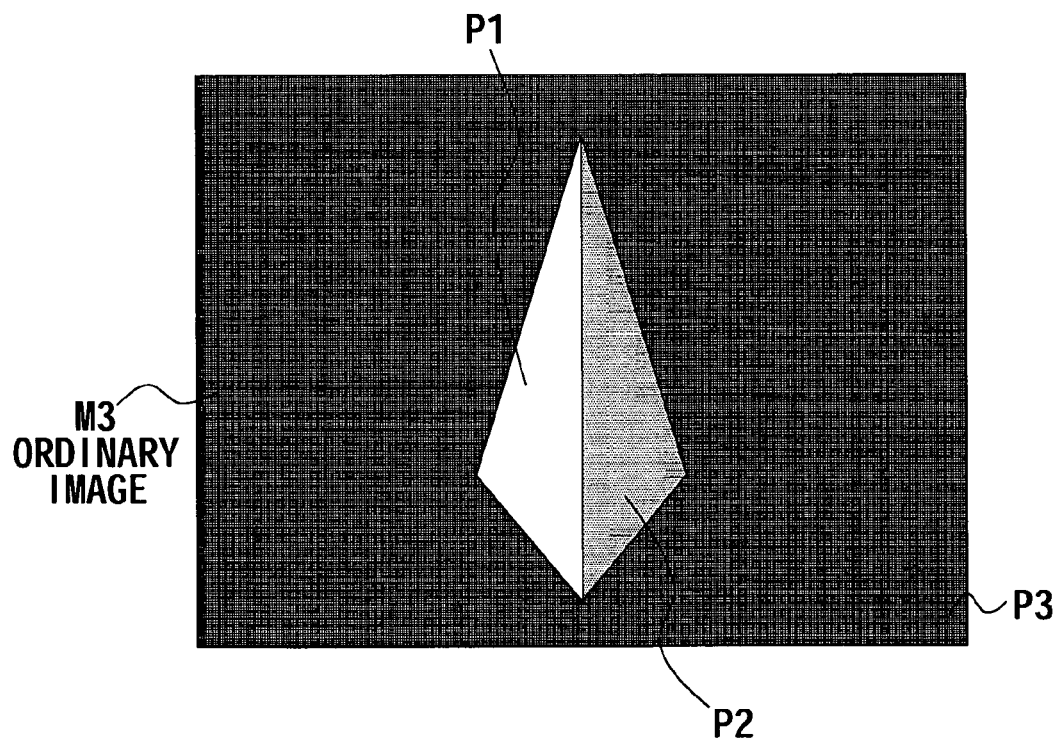
FIG. 11 shows a schematic conceptual image that can be displayed as ordinary image in the stereoscopic image visual effects confirmation control process.
Figure 12:
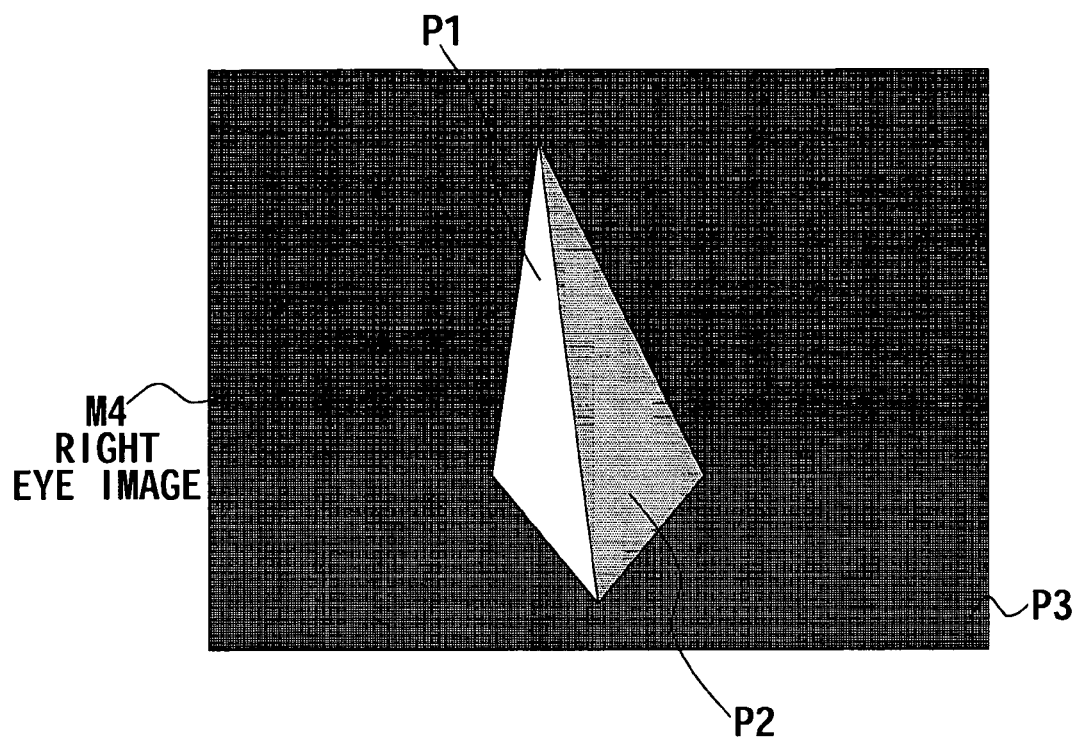
FIG. 12 shows a schematic conceptual image that can be displayed as right eye image in the stereoscopic image visual effects confirmation control process.
Figure 13:
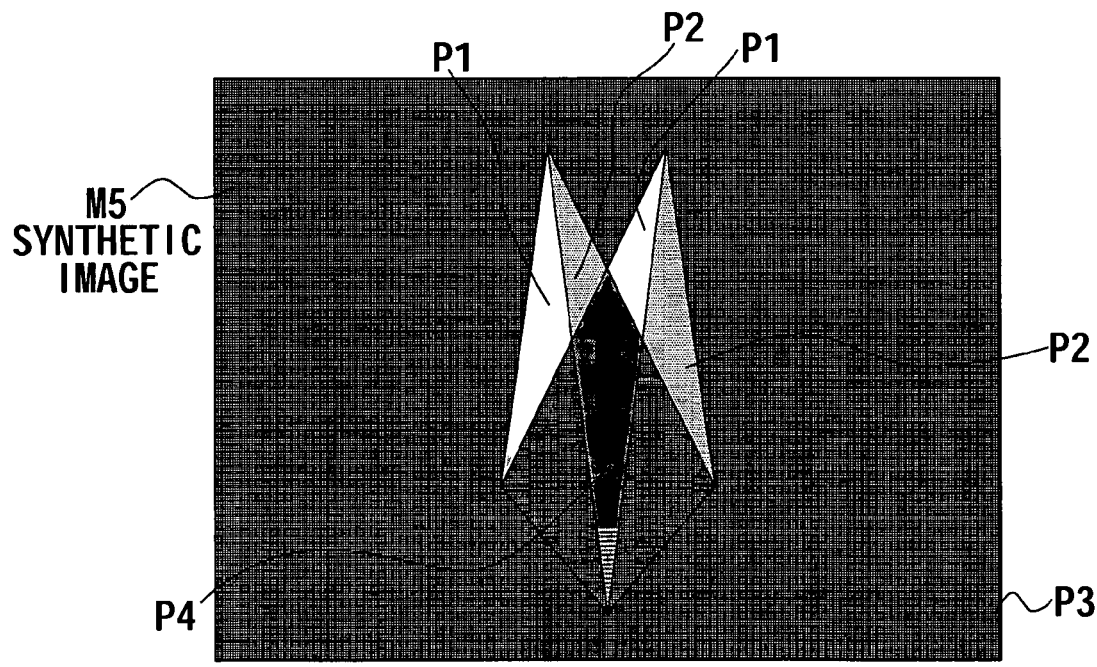
FIG. 13 shows a schematic conceptual image illustrating the parallax of the two eyes in the stereoscopic image visual effects confirmation control process.

At this time, the object imaged as left eye image M2 formed according to the left eye video decoded data D8 as shown in FIG. 10 is inclined rightward if compared with the normal image M3 as shown in FIG. 11, whereas the right eye image M4 formed according to the right eye video decoded data D9 as shown in FIG. 12 is inclined leftward if compared with the normal image M3 as shown in FIG. 11.

Thus, the synthetic image M5 that is formed according to the synthetic video data D10 is actually formed by synthetically combining the object viewed as the left eye image M2 and the object viewed as the right eye image M4 for superimposition and computationally performing synthetic operations to determine the absolute value of the difference between the left eye video decoded data D8 and the right eye video decoded data D9. Note that each pixel in the third hatched part P4 in FIG. 12 shows luminance level "32".

In Step SP22, the control section 9 of the recording/reproduction apparatus 1 converts the synthetic video data D10 on the lookup table 16 so as to make formula 6 shown below hold true:

$$f'(A, B) = g(f(A, B)) \qquad (6).$$

Note that table g is a lookup table for emphasizing all the luminance levels above a predetermined threshold value in the supplied image. If, for example, the threshold value of the table g is "200", the control section 9 generates synthetic video data D12 by converting the data of each pixel with a luminance level above "200" to data that shows luminance level "255" and the data of each pixel with a luminance level below "200" to data that shows luminance level "0". Then, the control section 9 proceeds to the next step, or Step SP23.

Figure 14:
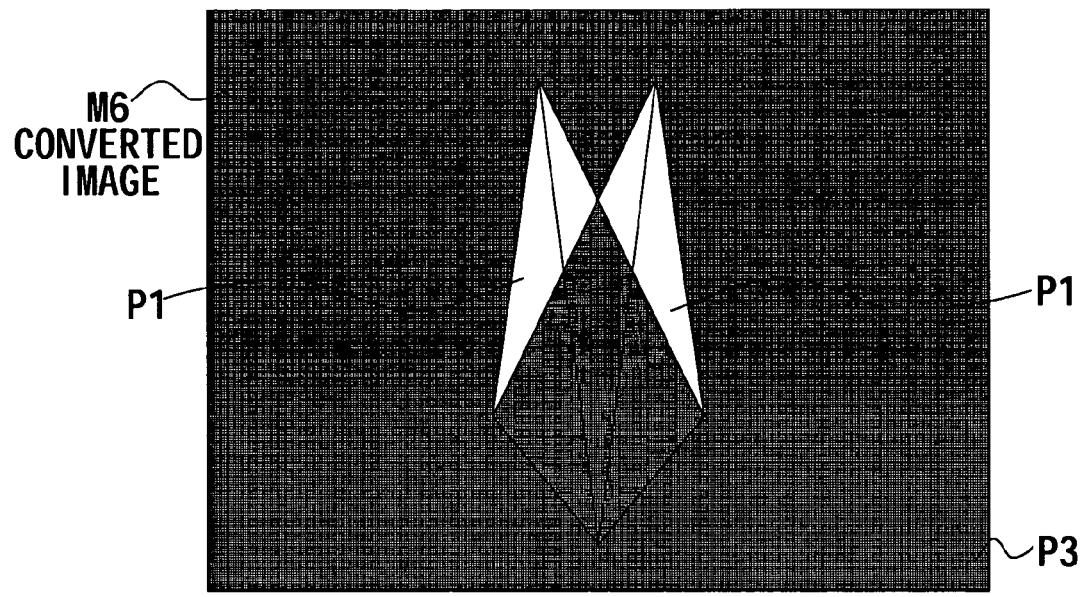
FIG. 14 shows another schematic conceptual image illustrating the parallax of the two eyes in the stereoscopic image visual effects confirmation control process.

The converted image M6 shown in FIG. 14 and formed according to the converted synthetic video data D12 is a parallax image for which the data of each pixel with a luminance level above "200" is converted to data that shows luminance level "225" and the data of each pixel with a luminance level below "200" is converted to data that shows a luminance level "0".

In Step SP23, the control section 9 of the recording/reproduction apparatus 1 generates displaying character string data D13 of a character string of "stereoscopic image visual effects confirmation" according to the arithmetic method indicating data D11 generated in response to the operation of the stereoscopic image visual effects confirmation button and then moves to the next step, or Step SP24.

In Step SP24, the control section 9 of the recording/reproduction apparatus 1 superimposes the converted synthetic video data D12 and the displaying character string data D13. In other words, the control section 9 generates stereoscopic image confirmation video data D14 by superimposing the displaying character string data D13 for "stereoscopic image visual effects confirmation" on the converted synthetic video data D12 and then moves to the next step, or Step SP25.

Figure 15:
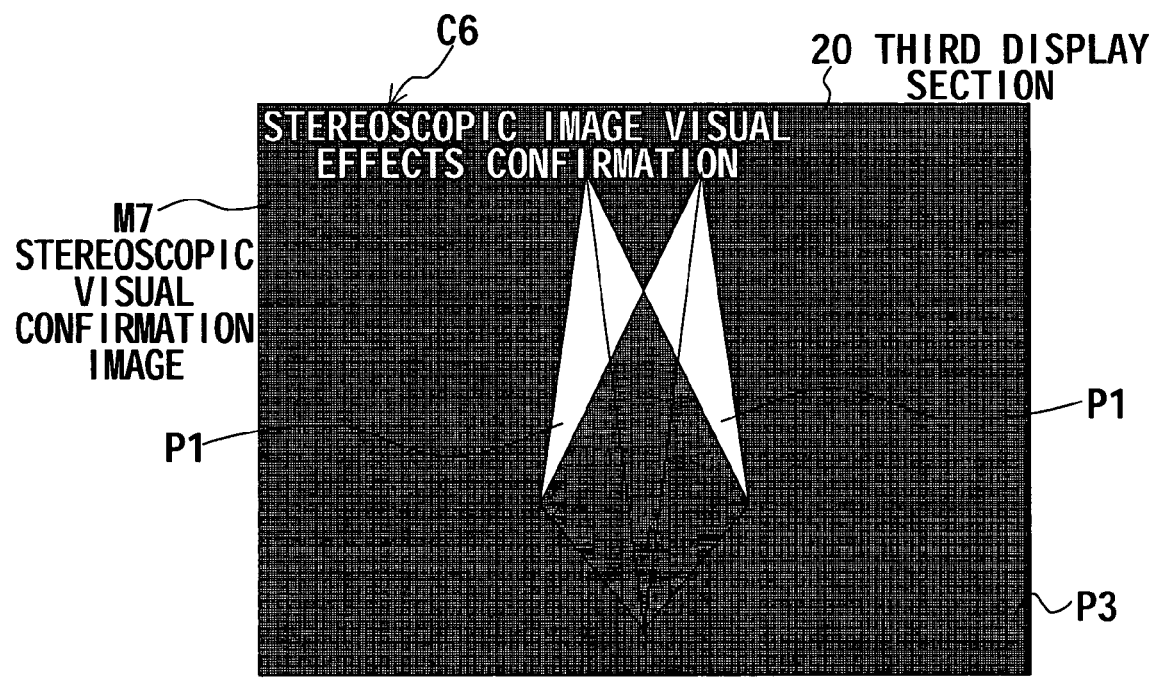
FIG. 15 shows a schematic conceptual image that can be displayed in the third display section in the stereoscopic image visual effects confirmation control process.

In Step SP25, the control section 9 of the recording/reproduction apparatus 1 sends out the stereoscopic image confirmation video data D14 to the third display section 20 and has the third display section 20 display a stereoscopic visual confirmation image M7 according to the stereoscopic image confirmation video data D14 as shown in FIG. 15 and then moves to the next step, or Step SP26.

As seen from FIG. 15, the control section 9 superimposes a stereoscopic image visual effects confirmation displaying character string C6 of "stereoscopic image visual effects confirmation" according to the displaying character string data D13 on an upper left part of the stereoscopic visual confirmation image M7.

In Step SP26, the control section 9 of the recording/reproduction apparatus 1 determines if the stop button of the operation section 8 is operated and operation data D3 that corresponds to the stop button is supplied or not. The control section 9 returns to Step SP21 when it is determined that the stop button is not operated, whereas it moves to the next step, or Step SP27, where it ends the process.

In reality, when generating a stereoscopic image having a predetermined part that appears as if jumping out, conventional recording/reproduction apparatus are required to execute a special effects process on the left eye video data D1 and the right eye video data D2 and the user is required to use a dedicated special, effects processing apparatus including a pair of polarization glasses. Particularly, conventional recording/reproduction apparatus are accompanied by a problem that it is not possible for the user to visually confirm the visual effects of a stereoscopic image, particularly a part of the stereoscopic image that appears as if jumping out (to be referred to as stereoscopic image part hereinafter) when the stereoscopic image is recorded outdoors.

To the contrary, with the recording/reproduction apparatus 1 of this embodiment, it is possible for the user to visually confirm the stereoscopic image part of a stereoscopic image with ease on site during the recording operation by synthetically combining the left eye image M2 according to the left eye video data D1 and the right eye image according to the right eye video data D2 for superimposition. Conventionally, such a stereoscopic image part of a stereoscopic image can be visually confirmed only by using a dedicated special effects processing apparatus after recording the stereoscopic image outdoors.

Such a stereoscopic image has a property that the stereoscopic image part appears as if jumping out very remarkably when the absolute value of the difference between the value of each of the pixels of that part in the left eye image M2 according to the left eye video data D1 and the value of the corresponding pixel of that part in the right eye image M4 according to the right eye video data D2 is large.

Thus, the recording/reproduction apparatus 1 can have the user to visually and intuitively confirm the stereoscopic image part very easily by outputting the stereoscopic image confirmation video data D14 to the third display section 20 that is generated by synthetically combining the left eye image M2 according to the left eye video data D1 and the right eye image M4 according to the right eye video data D2, computationally determining the absolute value of the difference of each of the pixels of the stereoscopic image part between the left eye video data D1 and the right eye video data D2, emphatically displaying the part where the absolute value of the difference of each pixel is larger than a predetermined threshold value and superimposing the converted synthetic video data D12 obtained as a result of the synthesis and the displaying character string data D13.

At this time, the recording/reproduction apparatus 1 can have the user operate the apparatus for recording or reproduction, visually confirming the stereoscopic image part in the recording operation or the reproducing operation, whichever appropriate. Additionally, if the arrangement and the position of each of the first image pickup section 2 and the second image pickup section 3 are changed, the user can visually confirm the visual effects of the stereoscopic visual confirmation image M7 on site for recording or reproduction so that the user can adjust the visual effects of the stereoscopic image part while he or she is imaging the object.

(3) Operation and Advantages

With the above-described arrangement, the recording/reproduction apparatus 1 outputs the superimposed arithmetic video data D14 generated by superimposing the converted arithmetic video data D12 obtained as a result of arithmetic operations performed on the first video decoded data D8 and the second video decoded data D9 and the displaying character string data D13 to the third display section 20.

Thus, with the recording/reproduction apparatus 1, it is not necessary to provide a plurality of display sections including the first display section 13 for displaying the first image and the second display section 14 for displaying the second image and the user can visually confirm the superimposed arithmetic image obtained superimposing the converted arithmetic video data D12 and the displaying character string data D13 that indicates the arithmetic method simply by outputting the superimposed arithmetic video data D14 as a result of arithmetic operations.

Additionally, the recording/reproduction apparatus can have the user visually confirm the left half of the first superimposed image M1A and the right half of the second superimposed image M1B on the single third display section 20 by displaying left half of the first superimposed image M1A and the right half of the second superimposed image M1B, using the cursor C4 as partition so that it is possible for the user to instantaneously compare the first superimposed image M1A and the second superimposed image M1B for the difference of color tone.

Still additionally, the recording/reproduction apparatus 1 can have the user to visually confirm the stereoscopic image part on site very easily by outputting the stereoscopic image confirmation video data D14 to the third display section 20 that is generated by synthetically combining the left eye image M2 according to the left eye video data D1 and the right eye image M4 according to the right eye video data D2, computationally determining the absolute value of the difference of each of the pixels of the stereoscopic image part between the left eye video data D1 and the right eye video data D2, emphatically displaying the part where the absolute value of the difference of each pixel is larger than a predetermined threshold value and superimposing the converted synthetic video data D12 obtained as a result of the synthesis and the displaying character string data D13. Conventionally, such a stereoscopic image part of a stereoscopic image can be visually confirmed only by using dedicated special effects processing apparatus after recording the stereoscopic image outdoors.

Thus, with the above-described arrangement, it is no longer necessary to provide a plurality of display sections including the first display section 13 for displaying the first image and the second display section 14 for displaying the second image because the recording/reproduction apparatus 1 outputs the superimposed arithmetic video data D14 generated by superimposing the converted arithmetic video data D12 obtained as a result of arithmetic operations performed on the first video decoded data D8 and the second video decoded data D9 and the displaying character string data D13 to the third display section 20. Therefore, it is possible to have the user visually confirm the superimposed arithmetic image obtained by superimposing the converted synthesis video data D12 obtained as a result of arithmetic operations and the displaying character string data D13 simply by outputting the superimposed arithmetic video data D14 obtained as a result of arithmetic operations to the third display section 20. In other words, it is possible for the user to visually conform the visual effects of a plurality of images with ease.

(4) Other Embodiments

While two video data including the first video data D1 and the second video data D2 are input to the embodiment respectively by way of the first input section 5 and the second input section 6 in the above description, the present invention is by no means limited to two inputs and the embodiment may be so adapted to receive three video data, or a plurality of video data in general, as inputs.

When the luminance level of a pixel is equal to or higher than "200", the corresponding video data is converted so as to make the pixel show a luminance level of "255" and, on the other hand, when the luminance level of a pixel is lower than "200", the corresponding video data is converted so as to make the pixel show a luminance level of "0" in the above description of the embodiment. However, the present invention is by no means limited thereto. For example, it may alternatively be so arranged that, when the luminance level of a pixel is equal to or higher than "128", the corresponding video data is converted so as to make the pixel show a luminance level of "255" and, on the other hand, when the luminance level of a pixel is lower than "200", the corresponding video data is converted so as to make the pixel show a luminance level of "0". What is essential to the present invention is to emphasize each pixel that shows a luminance level higher than a predetermined threshold value.

As pointed out, when the luminance level of a pixel is equal to or higher than "200", the corresponding video data is converted so as to make the pixel show a luminance level of "255" and, on the other hand, when the luminance level of a pixel is lower than "200", the corresponding video data is converted so as to make the pixel show a luminance level of "0" in the above description of the embodiment. However, the present invention is by no means limited thereto. For example, the data corresponding to a pixel that shows a luminance level equal to or higher than "200" may be converted so as to make the pixel appear red. What is essential to the present invention is to emphasize each pixel that shows a luminance level equal to or higher than a predetermined threshold value.

While an odd-numbered field (1st Field) of the (N-1)-th frame ((N-1) Frame) of the first video coded data D5 and an odd-numbered field (1st Field) of the (N-1)-th frame ((N-1) Frame) of the second video coded data D6 are recorded simultaneously on the recording medium 4 and they are read out simultaneously from the recording medium 4 in the above description of the embodiment, the present invention is by no means limited thereto. For example, it may alternatively be so arranged that frames of three video data, or a plurality of video data, are recorded on and read out from simultaneously.

While the embodiment of recording/reproduction apparatus 1 is a portable type recording/reproduction apparatus 1 in the above description, the present invention is by no means limited thereto and it may alternatively be a stationary type recording/reproduction apparatus.

While the user is made to instantaneously compare the first superimposed image M1A and the second superimposed image M1B for the difference of color tone with the above-described embodiment, the present invention is by no means limited thereto and the user may alternatively be made to compare the first superimposed image M1A and the second superimposed image M1B for the difference of contract or some other parameter. What is essential to the present invention is that a recording/reproduction apparatus according to an embodiment of the present invention is so arranged that the user can compare the first image and the second image on a single display section.

While the above-described embodiment of recording/reproduction apparatus 1 includes a recording/reproduction section 7, a control section 9, an arithmetic operation section 15, a displaying character string generation section 17 and a superimposition section 18, the present invention is by no means limited thereto and, alternatively, independent apparatus including a recording/reproduction apparatus, a control apparatus, an arithmetic operation apparatus, a displaying character string generation apparatus and a superimposition apparatus may be combined in a coordinated manner to form a recording/reproduction system for the purpose of the present invention and the apparatus other than the recording/reproduction apparatus may be external apparatus that are connected to the former by wires, wirelessly or by using some other mode of connection.

While the above-described embodiment includes an operation section 8 having a menu button, a jog lever for selecting a feature from the menu and a plurality of video arithmetic buttons in addition to a record button, a reproduction button and a stop button, the present invention is by no means limited thereto and the operation section 8 may further include a recording/reproduction button to be used for reproducing the data that is being recorded. With this arrangement, the user can visually confirm a stereoscopic image part while he or she is recording it.

While the above-described formula (1) is used for computations in the above-described embodiment provided that A represents the first video decoded data D8 and B represents the second video decoded data D9, the present invention is by no means limited thereto and formula (7) below may alternatively be used for computations.

$$f(A, B) = A \text{ and } B \quad (7)$$

Figure 16:
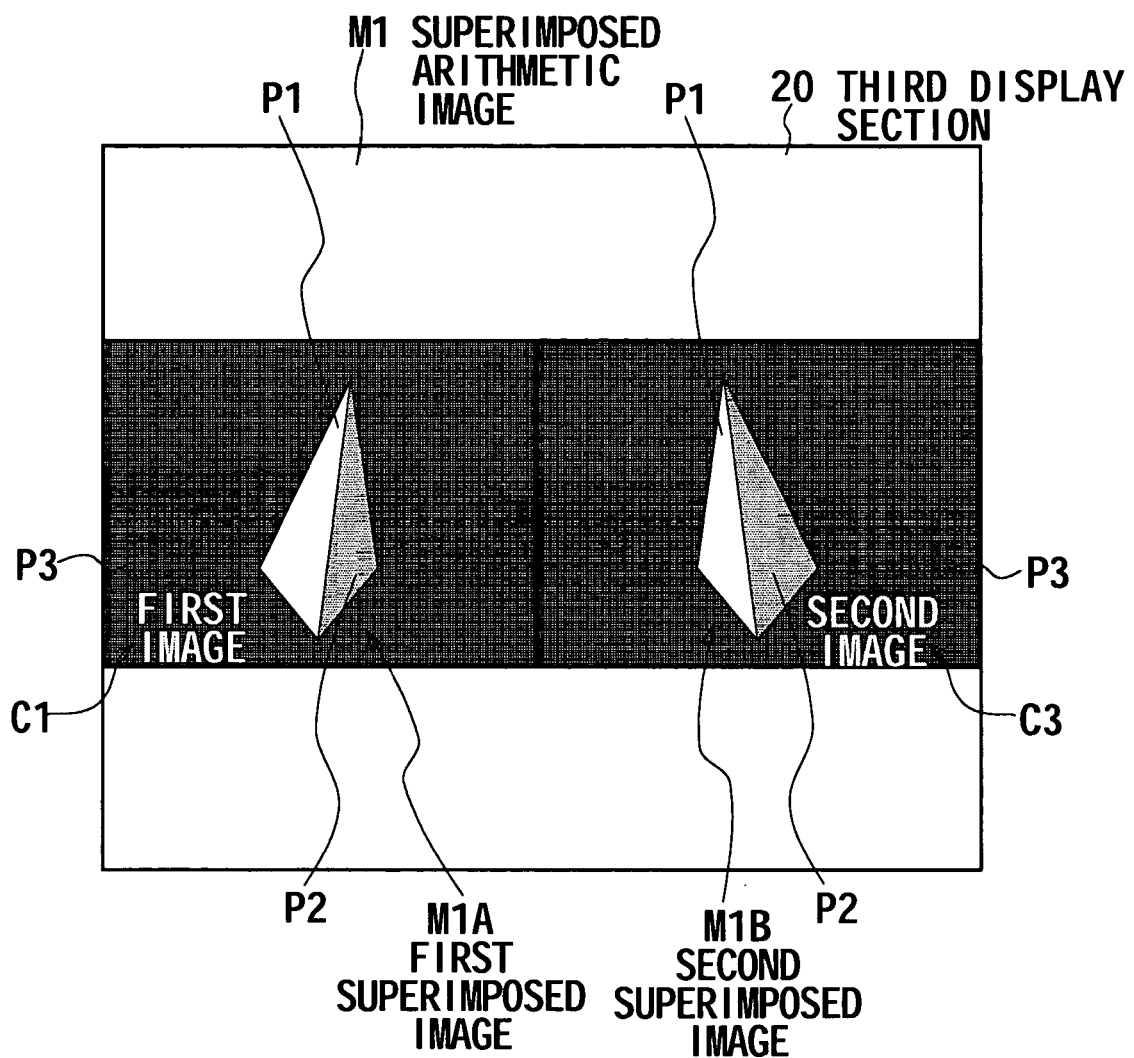
FIG. 16 shows a schematic conceptual image that can be displayed in the third display section of another embodiment.
Figure 17:
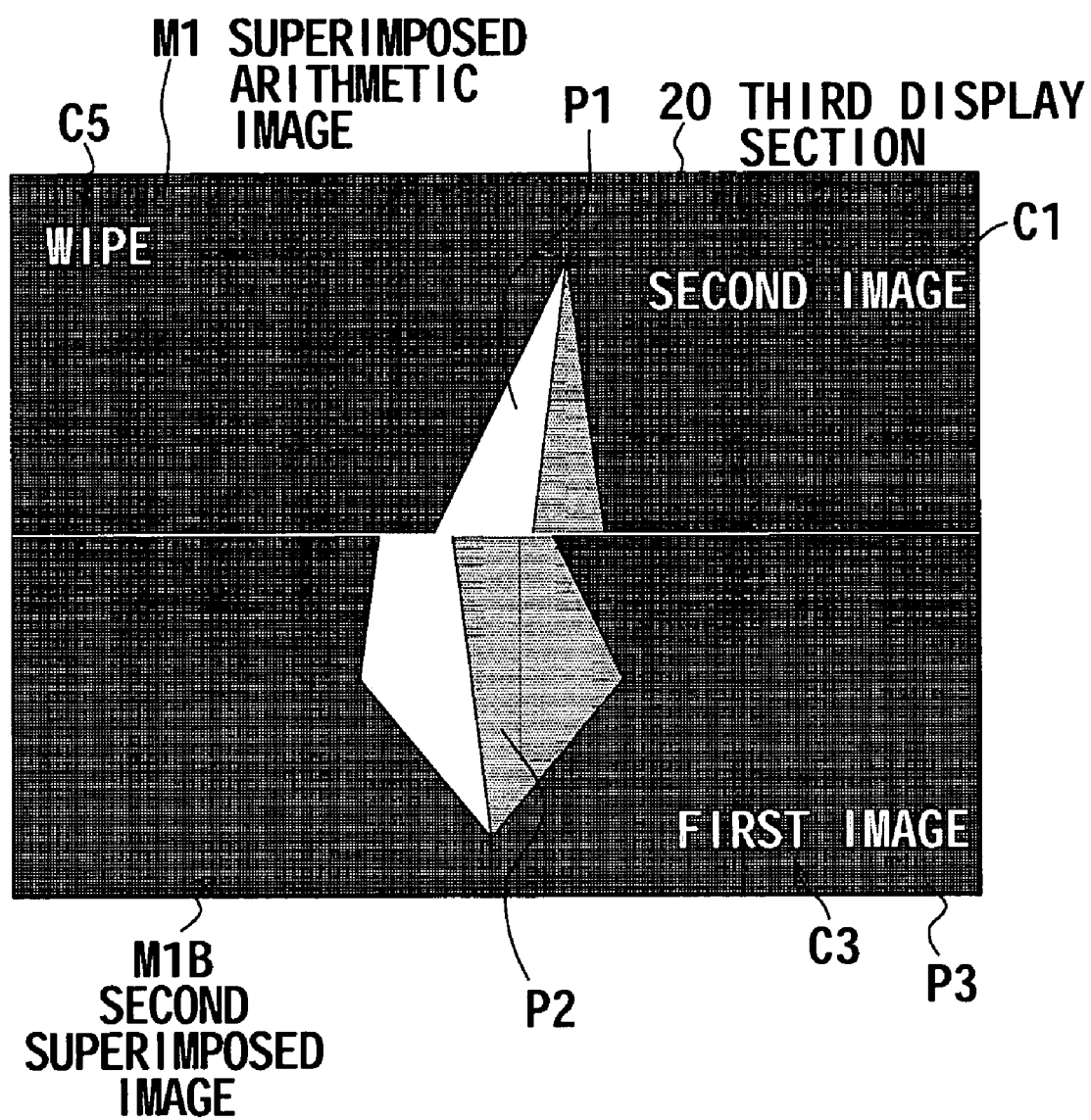
FIG. 17 shows a schematic conceptual image that can be displayed in the third display section of the embodiment of FIG. 16.

Still alternatively, three video decoded data, or a plurality of video decoded data, maybe used for computations. For the purpose of the present invention, f(A, B) represents a function having two variables and A and B means that the image of A and all the image of B are always displayed simultaneously. With this arrangement, it is possible to display the first superimposed image M1A and the second superimposed image M1B simultaneously on the third display section 20 without switching from the first superimposed image M1A to the second superimposed image M1B or vice versa, as shown in FIG. 16.

While the above-described formula (3) is used for computations in the above-described embodiment provided that A represents the first video decoded data D8 and B represents the second video decoded data D9, while M represents the horizontal length of the display screen of the third display section 20, m represents the horizontal position of the partition separating the first video decoded data D8 and the second video decoded data D9 and x represents the horizontal positional coordinate, the present invention is by no means limited thereto and formula (8) below may alternatively be used for computations:

$$f(A, B) = g(A, h-y) + g(B, y-h) \qquad (8),$$

where H represents the vertical length of the display screen of the third display section 20, h represents the vertical position of the partition separating the first video decoded data D8 and the second video decoded data D9 and y represents the vertical position coordinate. Still alternatively, three video data, or a plurality of video data in general, may be used for computations. When the above formula (8) is used for computations, the upper half of the first superimposed image M1A and the lower half of the superimposed image M1B are displayed simultaneously in place of displaying the left half of the first superimposed image M1A and the right half of the second superimposed image M1B simultaneously.

While data are recorded on the recording medium 4, which is a magnetic tape, by means of a single magnetic head 7D in the above description of the embodiment, the present invention is by no means limited thereto and the present invention can be applied to various other recording mediums including optical disks, magneto-optical disks, semiconductor memories and magnetic disks.

While various processes are executed by means of pieces of hardware that are responsible for the respective processes in the above-described embodiment, the present invention is by no means limited thereto and they may alternatively be executed by means of pieces of software. When various processes are executed by means of pieces of software that are responsible for the respective processes, it is possible to exploit various features by installing various programs in a computer whose dedicated hardware incorporates the programs of the software. For example, the programs may be installed into a general-purpose personal computer from a recording medium, which may be an optical disk, a magneto-optical disk, a semiconductor memory, magnetic disk or some other recording medium. Alternatively, the programs may be installed in a general-purpose personal computer by downloading by way of a network such as the Internet.

While the above-described embodiment of recording/reproduction apparatus or a stereoscopic image visual effects confirmation apparatus according to an embodiment of the present invention is formed by a recording/reproduction section 7, which operates as a recording/reproduction means, an arithmetic operation section 15 and a lookup table 16, which operate as an arithmetic operation means, and a displaying character string generation section 17 and a superimposition section 18, which operate as a superimposition means, the present invention is by no means limited thereto. A recording/reproduction apparatus or a stereoscopic image visual effects confirmation apparatus according to an embodiment of the present invention may alternatively be formed by a recording/reproduction means, an arithmetic operation means and a superimposition means having configurations different from those described above.

The present invention can be applied to a recording/reproduction apparatus adapted to record data on a magnetic tape by means of a single magnetic head or on some other recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. A recording/reproduction apparatus comprising:
   recording/reproduction means for recording a plurality of input sets of first and second video data and reading them from the recording mediums for reproduction;
   arithmetic operation means for performing one of at least first and second arithmetic operations by a method corresponding to an external instruction on the plurality of sets of first and second video data reproduced by the recording/reproduction means, wherein the second arithmetic operation is for simultaneously displaying, without overlap, a left portion of the first video data and a right portion of the second video data based upon a position of a partition; and
   superimposition means for generating character-string data indicating an arithmetic operation method of the arithmetic operation means, for superimposing arithmetic video data produced by arithmetic operations of the arithmetic operation means and the character-string data and for outputting the superimposed video data produced by the superimposition as outcome of arithmetic operations.

2. The apparatus according to claim 1, wherein
   for the first arithmetic operation the arithmetic operation means uses a set of first video data as the arithmetic video data while switching from the set of first video data to another set of second video data so as to use the another set of second video data as the arithmetic video data according to the external instruction.

3. The apparatus according to claim 1, wherein
   for the second arithmetic operation the arithmetic operation means operates for image synthesis, using a predetermined position in the arithmetic video data for the position of the partition for separating the set of first video data and another set of second video data, and
   the superimposition means generates cursor data for indicating the position of the partition for separating the set of first video data and another set of second video data and superimposes the cursor data on the position of the partition of the superimposed video data.

4. The apparatus according to claim 3, wherein
   the arithmetic operation means shifts the position of the partition for separating the set of first video data and the another set of second video data according to the external instruction, and
   the superimposition means superimposes the cursor data on the shifted position of the partition.

5. A recording/reproduction apparatus comprising:
   a recording/reproduction section for recording a plurality of input sets of first and second video data and reading them from the recording mediums for reproduction;
   an arithmetic operation section for performing one of at least first and second arithmetic operations by a method corresponding to an external instruction on the plurality of sets of first and second video data reproduced by the recording/reproduction section, wherein the second arithmetic operation is for simultaneously displaying, without overlap, a left portion of the first video data and a right portion of the second video data based upon a position of a partition; and a superimposition section (a) generating character-string data indicating the arithmetic operation method of the arithmetic operation section, (b) superimposing the arithmetic video data produced by arithmetic operations of the arithmetic operation section and the character-string data and (c) outputting the superimposed video data produced by the superimposition as outcome of arithmetic operations.

6. A recording/reproduction method comprising:

a recording/reproduction step of recording a plurality of input sets of first and second video data and reading them from the recording mediums for reproduction;

an arithmetic operation step of performing one of at least first and second arithmetic operations by a method corresponding to an external command on the plurality of sets of first and second video data reproduced in the recording/reproduction step, wherein the second arithmetic operation is for simultaneously displaying, without overlap, a left portion of the first video data and a right portion of the second video data based upon a position of a partition; and a superimposition step of (a) generating character-string data indicating the arithmetic operation method of the arithmetic operation step, (b) superimposing the arithmetic video data produced by arithmetic operations in the arithmetic operation step and the character-string data and (c) outputting the superimposed video data produced by the superimposition as outcome of arithmetic operations.

7. The method according to claim 6, wherein for the first arithmetic operation the arithmetic operation step is adapted to use a set of first video data as the arithmetic video data while switching from the set of first video data to another set of second video data so as to use the another set of second video data as arithmetic video data according to the external instruction.

8. The method according to claim 6, wherein for the second arithmetic operation the arithmetic operation step is adapted to operate for image synthesis, using a predetermined position in the arithmetic video data for the position of the partition for separating a set of first video data and another set of second video data, and the superimposition step is adapted to generate cursor data for indicating the position of the partition for separating the set of first video data and the another set of second video data and superimpose the cursor data on the position of the partition of the superimposed video data.

9. The method according to claim 8, wherein the arithmetic operation step is adapted to shift the position of the partition for separating the set of first video data and the another set of second video data according to an external instruction and the superimposition step is adapted to superimpose the cursor data on the shifted position of the partition.

10. A stereoscopic image visual effects confirmation apparatus comprising:

recording/reproduction means for recording input right eye video data and input left eye video data on an recording medium and reading them from the recording medium;

synthesis means for synthetically combining the right eye video data and the left eye video data reproduced by the recording/reproduction means and synthetically combining them for superimposition, wherein all luminescence levels above a predetermined threshold are set to a first value and all luminescence levels below the predetermined threshold are a set to a second value; and superimposition means for generating character-string data indicating the synthesis method of the synthesis means, for superimposing the synthesized video data synthetically produced by the synthesis means and the character-string data and for outputting the superimposed video data produced by the superimposition as outcome of synthesis.

11. The apparatus according to claim 10, wherein the synthesis means synthetically combines the right eye video data and the left eye video data so as to superimpose them one on the other and computes an absolute value of a difference between the right eye video data and the left eye video data for each pixel to emphasize a part where the absolute value of the difference of each pixel is equal to or greater than the predetermined threshold value.

12. A stereoscopic image visual effects confirmation method comprising:

a recording/reproduction step of recording input right eye video data and input left eye video data on an recording medium and reading them from the recording medium;

a synthesis step of synthetically combining the right eye video data and the left eye video data reproduced in the recording/reproduction step and synthetically combining them for superimposition, wherein all luminescence levels above a predetermined threshold are set to a first value and all luminescence levels below the predetermined threshold are a set to a second value; and a superimposition step of (a) generating character-string data indicating the synthesis method of the synthesis step, (b) superimposing the synthesized video data synthetically produced in the synthesis step and the character-string data and (c) outputting the superimposed video data produced by the superimposition as outcome of synthesis.

13. The method according to claim 12, wherein the synthesis step is adapted to synthetically combine the right eye video data and the left eye video data so as to superimpose them one on the other and compute an absolute value of a difference between the right eye video data and the left eye video data for each pixel to emphasize a part where the absolute value of the difference of each pixel is greater than the predetermined threshold value.

14. A recording/reproduction apparatus comprising:

a recording/reproduction section recording a plurality of input sets of first and second video data and reading them from the recording mediums for reproduction;

an arithmetic operation section performing one of at least first and second arithmetic operations by a method corresponding to an external instruction on the plurality of sets of first and second video data reproduced by the recording/reproduction section, wherein the second arithmetic operation is for simultaneously displaying, without overlap, a left portion of the first video data and a right portion of the second video data based upon a position of a partition; and a superimposition section (a) generating character-string data indicating the arithmetic operation method of the arithmetic operation section, (b) superimposing the arithmetic video data produced by arithmetic operations of the arithmetic operation section and the character-string data and (c) outputting the superimposed video data produced by the superimposition as outcome of arithmetic operations.

15. A stereoscopic image visual effect confirmation apparatus comprising:

a recording/reproduction section recording input right eye video data and input left eye video data on an recording medium and reads them from the recording medium;

a synthesis section that synthetically combining the right eye video data and the left eye video data reproduced by the recording/reproduction section and synthetically combines them for superimposition, wherein all luminescence levels above a predetermined threshold are set to a first value and all luminescence levels below the predetermined threshold are a set to a second value; and a superimposition section (a) generating character-string data indicating the synthesis method of the synthesis section, (b) superimposing the synthesized video data synthetically produced by the synthesis section and the character-string data and (c) outputting the superimposed video data produced by the superimposition as outcome of synthesis.

* * * * *